US011780464B2

(12) United States Patent
Funke et al.

(10) Patent No.: US 11,780,464 B2
(45) Date of Patent: Oct. 10, 2023

(54) AUTONOMOUS VEHICLE TRAJECTORY GENERATION USING VELOCITY-BASED STEERING LIMITS

(71) Applicant: Zoox, Inc., Foster City, CA (US)

(72) Inventors: Joseph Funke, Redwood City, CA (US); Steven Cheng Qian, San Francisco, CA (US); Kazuhide Okamoto, Mountain View, CA (US); Jacob Patrick Thalman, San Francisco, CA (US); Sriram Narayanan, San Jose, CA (US); Liam Gallagher, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 70 days.

(21) Appl. No.: 17/555,004

(22) Filed: Dec. 17, 2021

(65) Prior Publication Data

US 2023/0192127 A1    Jun. 22, 2023

(51) Int. Cl.
*B60W 60/00* (2020.01)
*B60W 50/00* (2006.01)

(52) U.S. Cl.
CPC ........ *B60W 60/0011* (2020.02); *B60W 50/00* (2013.01); *B60W 2050/006* (2013.01); *B60W 2050/0026* (2013.01); *B60W 2510/20* (2013.01); *B60W 2520/06* (2013.01); *B60W 2520/10* (2013.01); *B60W 2520/12* (2013.01)

(58) Field of Classification Search
CPC ................................................ B60W 60/0011
See application file for complete search history.

(56) References Cited

U.S. PATENT DOCUMENTS

| 8,718,860 | B2 * | 5/2014 | Waltz | B66F 9/063 |
| | | | | 701/25 |
| 10,606,270 | B2 * | 3/2020 | Englard | G05D 1/0274 |
| 11,104,332 | B2 * | 8/2021 | King | B60W 30/0956 |
| 2011/0035086 | A1 | 2/2011 | Kim et al. | |
| 2017/0108871 | A1 | 4/2017 | Watts | |

(Continued)

FOREIGN PATENT DOCUMENTS

KR    20210043225 A    4/2021

OTHER PUBLICATIONS

PCT Search Report and Written Opinion dated Apr. 25, 2023 for PCT application No. PCT/US2022/052727, 11 pages.

*Primary Examiner* — Michael A Berns
(74) *Attorney, Agent, or Firm* — Lee & Hayes, P.C.

(57) ABSTRACT

Techniques are described herein for generating trajectories for autonomous vehicles using velocity-based steering limits. A planning component of an autonomous vehicle can receive steering limits determined based on safety requirements and/or kinematic models of the vehicle. Discontinuous and discrete steering limit values may be converted into a continuous steering limit function for use during on-vehicle trajectory generation and/or optimization operations. When the vehicle is traversing a driving environment, the planning component may use steering limit functions to determine a set of situation-specific steering limits associated with the particular vehicle state and/or driving conditions. The planning component may execute loss functions, including steering angle and/or steering rate costs, to determine a vehicle trajectory based on the steering limits applicable to the current vehicle state.

20 Claims, 8 Drawing Sheets

(56) References Cited

U.S. PATENT DOCUMENTS

| | | |
|---|---|---|
| 2020/0001920 A1 | 1/2020 | Hejase et al. |
| 2020/0189573 A1 | 6/2020 | King et al. |
| 2021/0403049 A1* | 12/2021 | Funke ................ B62D 15/0255 |
| 2021/0403081 A1* | 12/2021 | Funke .................... B62D 6/001 |
| 2021/0403082 A1* | 12/2021 | Funke .................... B62D 6/001 |
| 2022/0032961 A1* | 2/2022 | Liu .................... B60W 60/0011 |

* cited by examiner

AUTONOMOUS VEHICLE TRAJECTORY GENERATION USING VELOCITY-BASED STEERING LIMITS

BACKGROUND

Autonomous vehicles use various techniques to navigate through driving environments that include static and dynamic objects. For instance, autonomous vehicles may use route planning and optimization techniques to determine trajectories for traversing through congested areas with other moving vehicles (autonomous or otherwise), pedestrians, a variety of stationary objects, etc. However, generating and optimizing trajectories for safe and effective navigation of autonomous vehicles can be a complex technical task involving a large number of variables. For example, an autonomous vehicle may include multiple subsystems that interact in complex ways. Additionally, anticipated or observed changes to the driving environment (e.g., object movements) also may increase the complexity of generating and optimizing trajectories for the vehicle to safely and effectively navigate the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
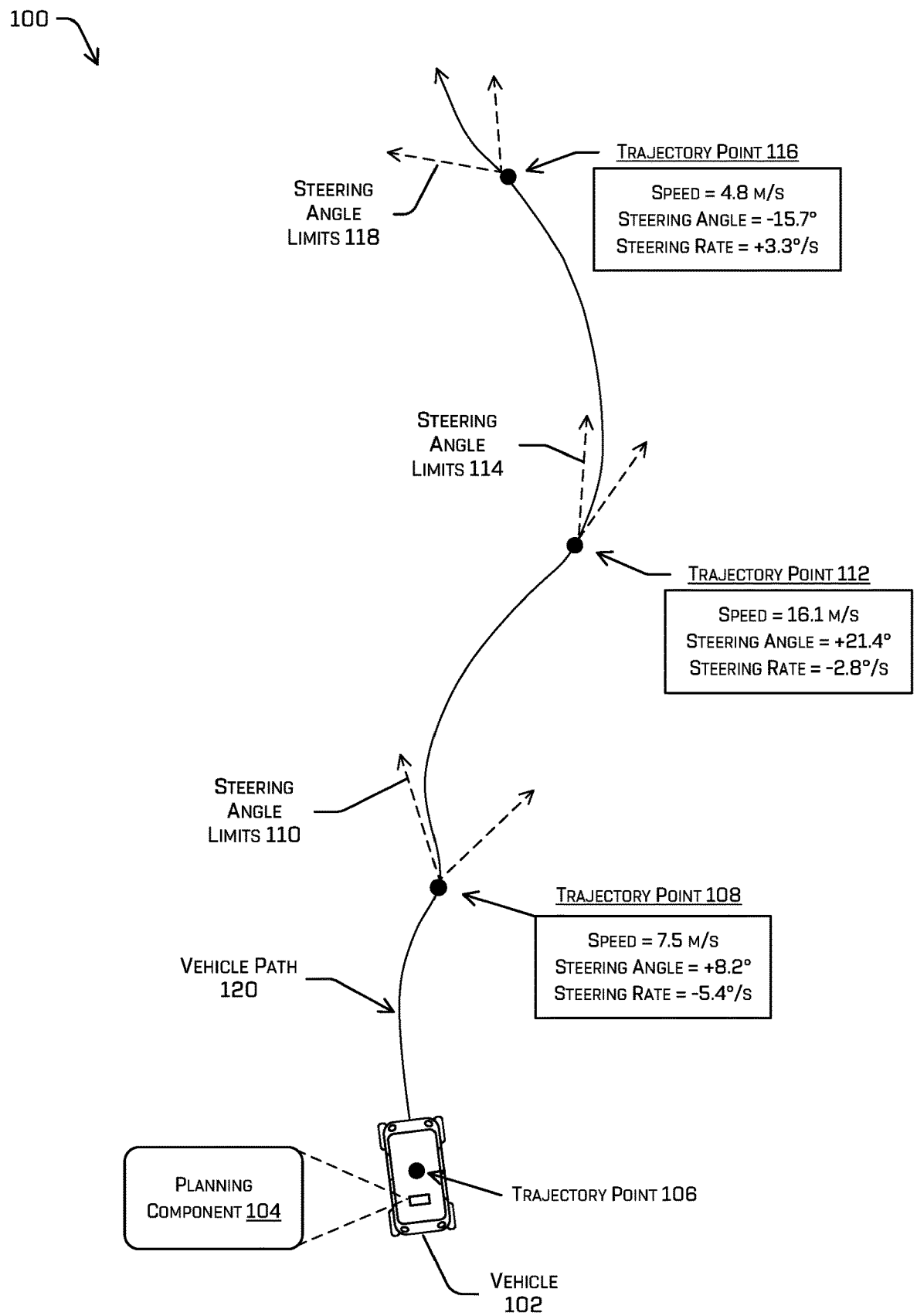
FIG. 1 illustrates an example technique of generating a vehicle trajectory using velocity-based steering limits, in accordance with one or more examples of the disclosure.

The techniques discussed herein relate to generating and/or optimizing trajectories for autonomous vehicles using velocity-based steering limits. As described in various examples below, a planning component of an autonomous vehicle can receive steering limits based on a kinematic model of the vehicle. In some cases, the steering limits may be determined by a remote system based on vehicle safety requirements, including maximum curvature and curvature rate data as a function of speed. The steering limits may be determined using kinematic and/or dynamic models of the vehicle, taking into account vehicle specifications such as wheelbase, wheel slip, and/or and lateral motion. In some examples, the remote system may provide steering limit data, such as steering angle limits and steering rate limits, to an autonomous vehicle as a table or other data structure including discrete and discontinuous steering limit values.

An autonomous vehicle may use the steering limit data received from the remote system to determine trajectories for the vehicle to follow in various driving situations and environments. In some examples, a planning component of the autonomous vehicle may convert the discrete and discontinuous steering limit values into a continuous steering limit function for use by the various trajectory generation and/or optimization components on the vehicle. For instance, the planning component may use a polynomial function, such as cubic spline interpolation, to generate a continuous and differentiable steering limit function based on a discrete lookup table of steering angle and/or steering rate limits.

When determining a trajectory for the vehicle during operation, the planning component may use the steering limit function to calculate particular steering limits based on a current vehicle state, driving environment, and/or driving conditions. For instance, the velocity of the vehicle may be provided as input to one or more steering limit functions to determine corresponding steering angle limits and/or steering rate limits. Additionally or alternatively, the planning component may determine various attributes of the current driving environment and/or driving conditions, such as the current weather conditions, traffic conditions, sensor range or visibility, time-of-day, road type, driving reference system, driving location or region, etc. In some examples, the planning component may provide the current driving environment and/or conditions as input to a steering limit function. In other examples, the planning component may determine a specific steering limit function to execute from a steering limit library, based on the driving environment and/or driving conditions.

The various components within an autonomous vehicle may use the steering limits to perform various navigational tasks, such as generating new trajectories, validating or optimizing existing or potential trajectories, and/or tracking the trajectories followed by the vehicle. In some examples, the planning component may determine and provide different steering angle and/or rate limits to different vehicle components performing different tasks. For instance, at the same time and for the same vehicle state and driving conditions, a planning component may receive one set of steering limits for trajectory generation, while a trajectory tracker component may receive a different set of steering limits for trajectory tracking. As an example, the steering limits (and/or steering limit functions) for the planner component may be determined using a kinematic bicycle model of the vehicle, while the steering limits (and/or steering limit functions) for the tracker component may be determined using a dynamic bicycle model. The dynamic bicycle model in this example may account for lateral motion and wheel slip, whereas the kinematic bicycle model may not. As a result, the dynamic model and kinematic model may generate different steering commands based on the same curvature, resulting in different steering limits and/or steering limit functions for the different components of the autonomous vehicle.

After determining steering limits for the steering angle and/or rate, the planning component may compare the steering limits to the observed steering behavior (e.g., current steering angle and/or current steering rate) of the vehicle during operation. Based on the results of the comparison, the planning component may determine that vehicle is operating within, at, or outside the current steering limits for the vehicle. The planning component may use the results of the comparison, for example, to adjust or optimize a current vehicle trajectory, or to determine a different trajectory for the vehicle. As noted above, the vehicle steering limits may be velocity-based. Therefore, when the vehicle is at or outside of the steering limits, the planning component may modify the steering angle, steering rate, and/or velocity of a trajectory to put the vehicle trajectory in compliance with the steering limits. Additionally, because the steering limits also may be based on the driving environment and/or driving conditions, different combinations of steering angles, steering rates, and velocities may be permissible for a vehicle trajectory depending on the weather conditions, driving location, time of day, etc.

In some examples, the planning component may use loss functions (or cost functions) that include steering costs to generate and/or optimize vehicle trajectories. The planning component may calculate costs based on the current vehicle steering (e.g., steering angle and/or rate) relative to the current steering limits. In some instances, the planning component may use an L2 hinge loss function to compute a cost (or loss) based on the steering limits and observed steering behavior of the vehicle. The planning component may execute loss functions based on steering costs, alone or in combination with other types of trajectory-related costs (e.g., optimal vehicle speed/velocity costs, optimal lateral acceleration costs, optimal lane positioning costs, optimal object safe distance costs, etc.). The loss functions invoked by the planning component may calculate an overall cost associated with a trajectory, based on multiple different cost factors, to determine an optimized (e.g., lowest cost) vehicle trajectory. After determining a trajectory using the velocity-based steering limits, as described in the various examples herein, the planning component may use the trajectory to control the vehicle to navigate the driving environment.

In some examples, the techniques described herein may be used to determine steering limits associated with a vehicle trajectory. For example, for an existing trajectory, the vehicle state data (e.g., velocity, steering data, etc.) of the waypoints in a trajectory can be provided as input to determine to sets of applicable steering limits based (at least in part) on the trajectory. Additionally or alternatively, any of the techniques described herein may be used to determine a vehicle trajectory associated with steering limits. For instance, a vehicle-specific continuous steering limit function generated as described herein may be used (e.g., along with additional continuation trajectory-related cost functions) as input to a trajectory optimization component (e.g., a Gaussian cost function for Bayesian optimization) configured to output an optimized trajectory based (at least in part) on the continuation steering function provided as input.

As shown in these and other examples, the techniques described herein may improve the functioning, safety, and efficiency of autonomous and semi-autonomous vehicles operating in driving environments. Vehicle trajectories generated and optimized using velocity-based steering limits may result in improved vehicle and passenger safety, improved passenger comfort metrics (e.g., less jerkiness, fewer instances of rapid lateral acceleration, etc.), and fewer potential vehicle safety hazards caused by unsafe steering behaviors. Additionally, the use of steering limits based on the current vehicle state, driving environment, and/or driving conditions also may allow the planning component to utilize the full steering range and provide additional maneuverability for the vehicle using situation-based steering limits. As an example, the planning component may determine less restrictive steering limitations based on the current road conditions, weather conditions, etc., providing the vehicle navigation components with more flexibility and a greater range of possible driving actions.

Additionally or alternatively, the loss functions used by the planning component may improve overall driving efficiency and vehicle safety, by balancing steering limit compliance with other potential trajectory-related costs. For example, the planning component thus can determine optimized trajectories holistically, by considering vehicle-specific and state-specific steering limits in combination with other vehicle safety and operational considerations. Trajectories generated and optimized as described herein also may provide greater trajectory consistency, thereby improving the computational efficiency and reducing the processing load used by vehicle systems configured to continuously perform navigation tasks such as object detection, trajectory prediction, and object tracking as the vehicle traverses the environment.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In another example, the techniques can be utilized in an aviation or nautical context, or in any system generating a trajectory. Additionally, the techniques described herein can be used with real data (e.g., captured using sensor(s)), simulated data (e.g., generated by a simulator), or any combination of the two.

FIG. 1 depicts an example environment 100 including a vehicle 102 with a planning component 104 configured to generate, evaluate, optimize, and/or track trajectories for the vehicle as it traverses through the environment. The environment 100 also depicts a trajectory associated with the vehicle 102. In this example, the trajectory is represented as a series of trajectory points 106, 108, 112, and 116. Trajectory point 106 may correspond to the current location and state of the vehicle 102, and trajectory points 108, 112, and 116 may correspond to subsequent states of the vehicle 102 and future times and locations as the vehicle traverses through the environment 100.

As noted above, an autonomous vehicle may determine any number of different trajectories at multiple times and/or locations as they navigate through driving environments. For instance, the trajectory in this example, defined by trajectory points 106, 108, 112, and 116, may represent a new trajectory generated by the planning component 104 for the vehicle 102 to follow through the environment 100. Additionally or alternatively, the trajectory in this example may represent a modified and/or optimized trajectory determined based on a previously generated trajectory (e.g., a route or reference trajectory) for the vehicle 102. The trajectory in this example also may represent an existing trajectory that the vehicle 102 is currently following, or may represent a possible alternative trajectory that may be evaluated by the planning component 104 after which it may or may not be followed by the vehicle 102.

For any of these examples of trajectories, including implemented and/or proposed trajectories, reference and/or optimized trajectories, planned and/or tracked trajectories, etc., the techniques described herein relate to determining and using velocity-based steering limits associated with the vehicle trajectories. As described below, the steering limits for the vehicle 102 may include one or more steering angle limits and/or one or more steering rate limits. When generating a new trajectory for the vehicle 102 (described below in more detail), the planning component 104 may ensure that the new trajectory complies with and/or takes into account the steering limits. Similarly, when an existing trajectory of the vehicle 102 is modified or optimized, the planning component 104 may use the steering limits when performing the modification and/or optimization. The planning component 104 also may evaluate potential trajectories of the vehicle 102, and may track the existing trajectories being implemented (or followed) by the vehicle 102, and may perform vehicle behavior adjustments and/or trajectory changes as needed to prevent the vehicle 102 from exceeding its steering limits.

In general, a planning component of an autonomous vehicle (e.g., planning component 104 of vehicle 102) can receive and/or generate trajectories for the vehicle to traverse routes through an environment, from the current location of the vehicle to a target location. A target location may include a destination of the vehicle or may include an intermediary point on a spatial and/or time horizon along the route of the vehicle towards a farther destination. As shown in this example, a trajectory may include a sequence of points (e.g., waypoints) that are positioned between (e.g., temporally and/or spatially) the current location of a vehicle and a target location. Each point in a trajectory (e.g., trajectory points 106, 108, 112, and/or 116) can be fixed in time and/or in space, and may include vehicle state data (e.g., positions, orientations, velocities, and/or accelerations) and/or control commands associated with the vehicle at the corresponding time/location of the trajectory point. Within the trajectory, the control commands at the trajectory points may include data representing signals to be sent to drive the actuators of the vehicle, such as signals for brakes, steering, accelerators, suspensions, and/or other vehicle controls. The vehicle states and/or control commands within a trajectory may be used to perform various vehicle maneuvers (or actions), including slowing or stopping the vehicle, moving the vehicle according to the details of the trajectory, changing the vehicle direction or speed, etc. Additionally, as noted above, a trajectory might not necessarily play out to its target and can be modified or overridden by the planning component and/or other vehicle control systems while the vehicle is traversing the environment.

A vehicle trajectory may be stored as a data structure including the set of trajectory points. For each trajectory point, the trajectory data structure may store a vehicle location, time, movement vector, and/or any other data representing the vehicle state and/or vehicle command controls associated with the trajectory point. As a whole, the sequence of trajectory points can be used for monitoring and controlling the vehicle from its start location and state to the target location and state of the trajectory. In some examples herein, a trajectory may be referred to as a spatial trajectory or temporal trajectory. A spatial trajectory may include a number of space-discretized trajectory points, in which each trajectory point is associated with a fixed physical location and is not necessarily (but may be) associated with a fixed time. In contrast, a temporal trajectory may include a number of time-discretized trajectory points, in which each trajectory point is associated with a fixed time and is not necessarily (but may be) associated with a fixed physical location. Accordingly, a trajectory point in a spatial trajectory may define the vehicle state data and vehicle control commands that are associated with the particular physical location of the trajectory point, whereas a trajectory point in a temporal trajectory may define the vehicle state data and vehicle control commands that are associated with the particular time of the trajectory point. When navigating based on spatial and/or temporal trajectories, the planning component 104 of the vehicle 102 may monitor the vehicle states relative to each trajectory point, and may execute the control commands associated with the trajectory points at the associated locations and/or times, to control the vehicle to traverse the trajectory to the target location.

In various examples, the planning component 104 of the vehicle 102 may be configured to determine and execute trajectories that perform various on-route and/or off-route driving maneuvers (or actions). For instance, the environment 100 may correspond to an on-route environment having a route-based reference system, and the trajectory shown may correspond to an on-route driving maneuver. In other cases, the environment 100 may correspond to an off-route environment (or to an on-route environment where the route-based reference system is not applied), and the trajectory shown may correspond to an off-route driving maneuver.

Within on-route environments, a route-based reference system may include a coordinate frame and designated routes based on one or more maps of an environment. For instance, the vehicle 102 may include a localization component and maps modeled in two or more dimensions that provide information about the environment, such as topologies (e.g., intersections), streets, roads, terrain, and the environment in general. In a route-based reference system, the vehicle 102 may follow route-based trajectories toward a target location and may perform route-based actions such as continuing straight along a route, executing lane changes, merging or turning onto different roads, etc.

Driving environments that are not associated with route-based reference systems may be referred to as off-route environments. For example, parking lots, driveways, school or corporate campuses, and/or other private road systems might not be included in any route-based reference system(s) available to the vehicle 102. Additionally, construction projects, road damage, and/or accidents might alter route-based reference systems by closing lanes, diverting traffic, etc. In these environments, the vehicle 102 may perform off-route actions that do not correspond to designated roads, sidewalks, or other throughways defined by a route system. To perform off-route actions, the planning component 104 may generate off-route trajectories, such as trajectories within parking lots, or trajectories to perform maneuvers such as parking, pulling over, going in reverse, etc. In some examples, the vehicle 102 may use an inertial-based reference system when determining and executing trajectories in off-route environments. In some examples, temporal trajectories may provide particular advantages (e.g., in contrast to spatial trajectories) for navigating off-route environments. For instance, off-route actions such as parking maneuvers, pulling over for passenger pick-ups or drop-offs, and the like, may be more time-sensitive than standard on-route driving actions. Additionally, off-route actions may include reversing the vehicle and similar maneuvers which can cause errors in trajectory generation and optimization operations on spatial trajectories that do not include temporal data associated with the trajectory vehicle states or controls.

The planning component 104 may determine and apply steering limits for the vehicle 102 at any trajectory point, and/or at any other time or location as the vehicle 102 traverses the environment 100. For example, when a predetermined trajectory is defined as a set of discrete trajectory points (e.g., trajectory points 106, 108, 112, and 116), the planning component 104 may determine steering limits for each trajectory point, and may evaluate the behavior of the vehicle based on the steering limits at each trajectory point. In this example, for trajectory point 108, the planning component 104 may determine steering angle limits 110 based on the vehicle state at the trajectory point 108 (e.g., the vehicle velocity and steering angle). Similarly, for trajectory point 112, the planning component 104 may determine steering angle limits 114 based on the vehicle state at the trajectory point 112, and for trajectory point 116, the planning component 104 may determine steering angle limits 118 based on the vehicle state at the trajectory point 116. Additionally, although this example only depicts steering angle limits 110, 114, and 118 for the vehicle 102, similar techniques may be used to determine steering rate limits for any trajectory point, and/or for other time or location as the vehicle 102 traverses the environment.

As shown in this example, the planning component 104 may determine steering limits based at least in part on a current velocity of the vehicle 102. For instance, as the velocity increases the steering angle limits and steering rate limits for the vehicle 102 may decrease, and vice versa. In this example, the steering angle limits 110 may be a range of steering angles determined by the planning component 104, based on the steering angle and velocity of the vehicle at trajectory point 108. Because the velocity of the vehicle 102 increases between trajectory point 108 and trajectory point 112, the planning component 104 may determine a narrower range of steering angle limits 114 at trajectory point 112 (e.g., when optimizing for the associated state and/or controls associated with trajectory point 112). Then, because the velocity of the vehicle 102 decreases again after trajectory point 112, the planning component 104 may determine a larger range of steering angle limits 118 at trajectory point 116 as with trajectory point 112. Although these examples describe determining steering limits (e.g., steering angle limits and/or steering rate limits) based on vehicle velocity, in other examples, the planning component 104 may use any combination of vehicle state data and/or other driving environment data or driving conditions data to determine steering limits for the vehicle 102 at a particular trajectory point (or any other driving time/location).

As noted above, trajectories may be predetermined by the planning component 104, including trajectory points having predetermined vehicle states and predetermined vehicle control commands. As a result, the planning component 104 may determine the steering limits for a trajectory point, and may evaluate the steering behavior of the vehicle 102 based on the steering limits at the trajectory point, any time after the trajectory is initially determined (e.g., before the vehicle 102 physically reaches the trajectory point). In such cases, the planning component 104 may determine and apply the steering limits to pre-evaluate a trajectory in advance, thereby allowing the trajectory to be modified, optimized, or replaced by the planning component 104, before the vehicle 102 drives the trajectory, based on the pre-evaluation of the vehicle steering limits at the trajectory points.

Additionally or alternatively, the planning component 104 may determine and apply the steering limits at any point between the trajectory points (e.g., any location or driving time between trajectory points 106-108, between trajectory points 108-112, or between trajectory points 112-116, etc.). For example, at any time while the vehicle 102 is moving through the environment 100, the planning component 104 may determine steering limits based on the current state of the vehicle (e.g., velocity, driving conditions, etc.). The planning component 104 then may compare the current steering behavior of the vehicle (e.g., steering angle and/or steering rate) to the current steering limits. Based on the comparison, the planning component 104 may determine modified control commands for the vehicle 102, such as decreasing or increasing velocity, modifying the driving angle or rate, etc. Additionally, the planning component 104 may resample and/or modify future trajectory points along the current trajectory, in response to determining that the vehicle 102 is exceeding (or may be close to exceeding) the current steering limits.

The vehicle path 120 may represent the actual driving path of the vehicle 102 through the environment 100. As noted above, the vehicle path 120 may align with a reference trajectory or optimized trajectory followed by the vehicle 102. Additionally or alternatively, the vehicle path 120 may correspond to a modified version of a trajectory generated by the planning component 104, in which the planning component 104 may determine on-the-fly trajectory modification based on the steering limits, object changes within the environment, and/or other vehicle navigation factors.

Figure 2:
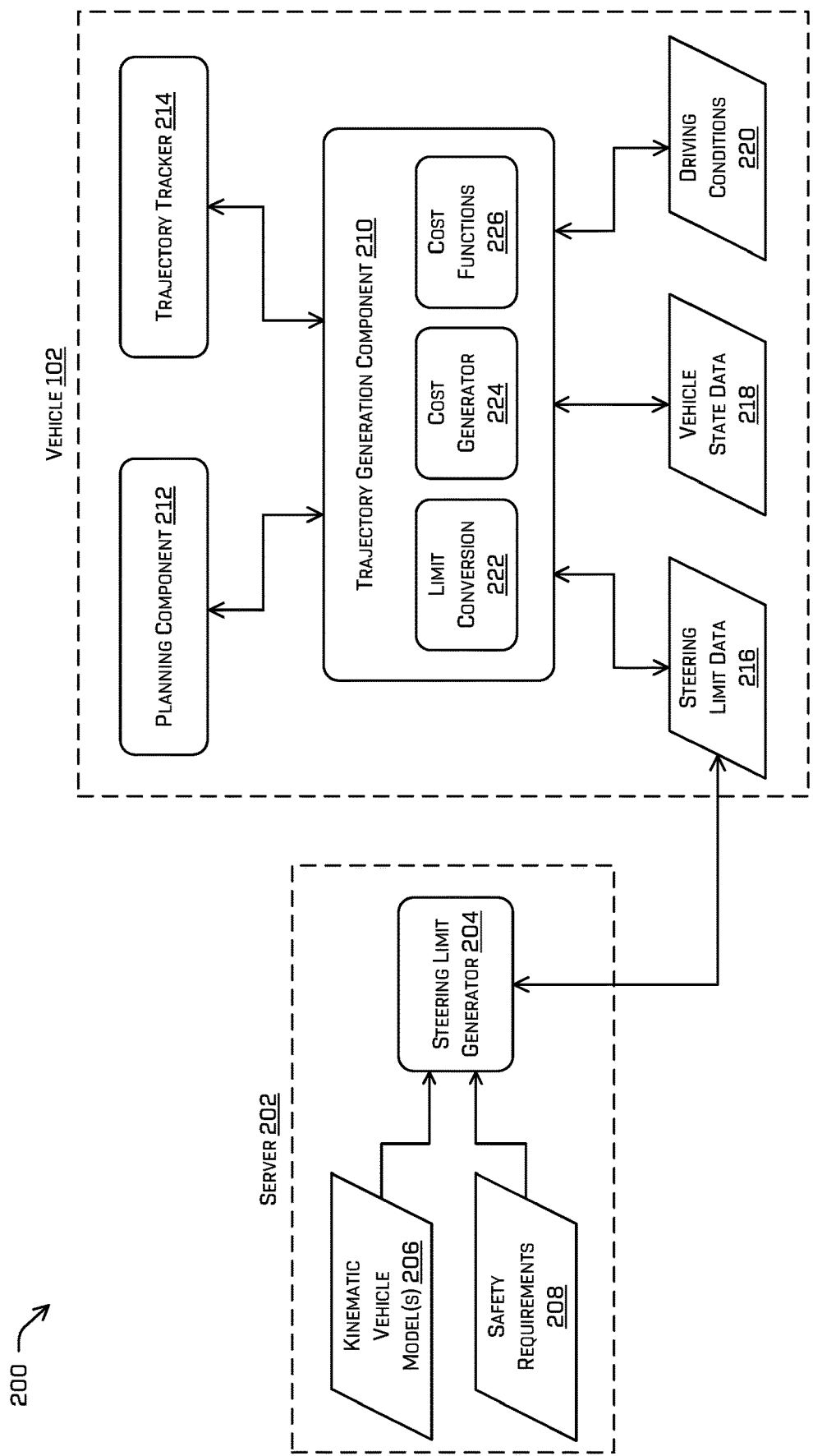
FIG. 2 illustrates an example system including components for generating and/or optimizing vehicle trajectories using cost functions, based on vehicle state and/or driving conditions, in accordance with one or more examples of the disclosure.

FIG. 2 depicts a block diagram illustrating a system 200 for determining and enforcing steering limits in autonomous vehicles. As shown in this example, the system 200 may be a distributed system including a number of components (e.g., processes, services, data stores, etc.) in a server 202, and additional components in a vehicle 102. The vehicle 102 may be similar or identical to the vehicle 102 described above. As shown in this example, the server 202 may include a steering limit generator 204 configured to determine steering limits associated with various autonomous vehicles, and to transmit appropriate sets of the steering limits to particular vehicles. In contrast, the vehicle 102 may be configured to receive steering limits from the server 202 and to apply the steering limits based on the current vehicle state (e.g., velocity), and/or the current driving environment or conditions of the vehicle 102. As described below, the distributed architecture of the system 200 may provide advantages of allowing the server 202 to determine steering limits for a diverse fleet of vehicles using kinematic/dynamic vehicle models and a uniform set of safety requirements, while allowing the individual vehicles to apply the steering limits differently based on the current vehicle state and driving conditions. However, in other examples, the system 200 need not be a distributed system and any or all of the components described herein can be included within the vehicle 102.

The steering limit generator 204 may be configured to determine steering limits associated with one or more autonomous vehicles, based at least in part on the kinematic model(s) 206 of the vehicles and a number of safety requirements 208 associated with the vehicles. In some examples, the server 202 may store any number of kinematic models and/or dynamic models associated with different vehicles in a fleet. For instance, kinematic model(s) 206 may include a kinematic bicycle model of the vehicle 102, as well as different kinematic models for different vehicles in the fleet. In some instances, dynamic models of the vehicle 102 (e.g., a dynamic bicycle model) may be used in addition to or instead of kinematic models. As noted above, a dynamic bicycle model may account for lateral motion and wheel slip, in contrast to a kinematic bicycle model which might not.

The safety requirements 208 may include requirements for maximum curvature and/or maximum curvature rate as a function of speed. In various examples, the safety requirements 208 may be associated with a particular vehicle 102, a vehicle make/model, and/or may include standard requirements applicable to a fleet of different types of vehicles. In some cases, the safety requirements may be determined based on an assumption that a malfunction occurs within vehicle 102 causing the vehicle 102 to arbitrarily command a maximum steering angle during normal operation. The server 202 may determine the maximum curvature and/or maximum curvature rate based on a maximum acceptable lateral deviation for the vehicle 102 from its intended path.

Based on the maximum curvature and/or maximum curvature rate (and/or other safety requirements 208), the steering limit generator 204 may determine one or more steering angle limits and/or steering rate limits for the vehicle 102. The steering limit generator 204 may determine the steering limits using the kinematic models 206 (and/or dynamic models), taking into the wheelbase, wheel slip, and/or lateral motion of the vehicle 102, as well as any other vehicle specifications. As described below, the steering limits determined by the steering limit generator 204 may include tables (or other sets of discrete values) defining different steering limits based on vehicle velocity. The steering limit generator 204 then may transmit the steering limits to any number of vehicles, to be applied separately by each vehicle 102 based on the current velocity and/or driving conditions of the vehicle 102.

In various examples, a library of different steering limits may be generated and stored on the server 202, on the vehicle 102, or both. For instance, using the techniques described herein, the steering limit generator 204 may generate and store different sets of steering limits for different vehicle models (e.g., different combinations of vehicle make, model, year, trim, and features, etc.) on the server 202. For any number of the different vehicle models, the steering limit generator 204 also may generate and store different sets of steering limits for different combinations of driving regions (e.g., particular countries, cities, states, counties, etc.), types of driving locations (e.g., rural, suburb, or city driving, highway driving, off-route environment driving, driving in school zones or construction zones, driving at intersections, etc.), and/or types of driving conditions (e.g., night driving, dusk or dawn driving, high- or low-visibility driving, driving in clear and dry conditions, driving in rain, snow, fog, etc.). Additionally or alternatively, the steering limit generator 204 may generate and store different sets of steering limits for different vehicle components (e.g., a trajectory generator/planner component, a trajectory optimizer component, a prediction component, a trajectory tracker component, etc.).

The steering limit generator 204 can generate and store steering limit libraries, including any combinations or permutations of the various types of steering limits. In some cases, a steering limit library stored on the server 202 may include different sets of steering limits associated with different vehicle models/types. An individual autonomous vehicle (e.g., vehicle 102) then may transmit a request to the server 202 to receive one or more sets of steering limits associated with the vehicle. Additionally or alternatively, the vehicle 102 may store a steering limit library including different sets of steering limits associated with the vehicle 102, including steering limits corresponding to different driving regions, different driving locations, different driving conditions, and/or different vehicle components, etc. In these examples, the planning component 104 and/or other components of the vehicle 102 may request particular sets of steering limits based on the current driving region, location, and conditions, etc., thereby allowing the vehicle to implement different sets of steering limits customized to particular driving environments and driving situations.

In various examples, one or more computer systems (of the vehicle 102, of the remote server 202, etc.) may determine a simplification of the determined steering limits. As noted above, and described herein, such simplifications may comprise curve-fitting techniques and the like. In at least some examples, such simplifications may enable various optimizations by generating a continuous and differentiable function of steering angle over a set or range of vehicle states.

As shown in this example, the vehicle 102 may include a trajectory generation component 210 configured to determine trajectories based at least in part on the steering limits of the vehicle 102. The trajectory generation component 210 may receive requests for trajectories from various component of the vehicle 102, including (but not limited to) a planning component 212 and a trajectory tracker component 214. As noted above, the trajectory generation component 210 may apply different sets of steering limits and/or may generate different trajectories based on which component requests the trajectory. For instance, the trajectory generation component 210 may determine a first trajectory for the planning component 212 using steering limits based on a kinematic bicycle model, and may determine a different second trajectory for the trajectory tracker component 214 using steering limits based on a dynamic bicycle model that does account for lateral motion or wheel slip.

When determining a trajectory for the vehicle 102, the trajectory generation component 210 may receive and use the steering limit data 216 received from the steering limit generator 204, as well as vehicle state data 218 and/or driving conditions data 220 from one or more internal components of the vehicle. The steering limit data 216 may include any number of the steering limits described herein associated with the vehicle 102. The vehicle state data 218 may include any internal state data of the vehicle, including but not limited to the vehicle velocity, orientation, pose, steering angle, steering rate, number of passengers, vehicle curb weight, etc. The driving conditions data 220 may include any attributes of the vehicle driving environment and/or driving conditions described herein, including but not limited to the current driving region or location of the vehicle 102, the current vehicle driving location type, the current weather conditions, current road conditions, or any other attribute of the current driving conditions or environment. In various examples, the trajectory generation component 210 may determine one or more multiple different trajectories associated with the vehicle 102, based on any combination of the steering limit data 216, the vehicle state data 218, driving conditions data 220, and/or based on the vehicle component(s) requesting the trajectory.

As shown in this example, the trajectory generation component 210 may include a steering limit conversion component 222, a cost generator component 224, and/or a cost function component 226. The trajectory generation component 210 may use these components in combination, as described below, to determine and/or evaluate a trajectory for the vehicle 102 from multiple possible trajectories, based at least in part on the vehicle steering limits.

The limit conversion component 222 may be configured to receive steering limit data 216 and convert the limit data into a function. As noted above, in some cases the steering limit data 216 may include a set of discrete and discontinuous steering limit values representing maximum steering angles and/or rates associated with different vehicle velocities, or vice versa. In such cases, the limit conversion component 222 may convert the discrete and discontinuous steering limit data into a continuous and/or differentiable function that can be used to determine steering costs for the vehicle 102. For instance, to convert a lookup table of velocity-based maximum steering angles and/or velocity-based maximum steering rates, the steering limit conversion component 222 may use cubic spline interpolation (or any other applicable polynomial) to generate a continuous function based on the discrete steering limit values in the lookup table. Examples of using cubic spline interpolation to generate a continuous steering limit function are described below in reference to FIG. 4.

The cost generator component 224 may be configured to execute one or more loss functions (or cost functions) to calculate costs associated with a steering angle and/or steering rate of the vehicle 102. As noted above, any steering costs calculated by the cost generator component 224 may be used by the cost function component 226, along with various other types of trajectory cost factors to determine an optimized (e.g., lowest cost) vehicle trajectory. In some cases, the cost generator component 224 may use the velocity of the vehicle 102 and the steering limit function(s) determined by the steering limit conversion component 222, to determine current limits for steering angle and/or steering rate. The cost generator component 224 then may use the loss functions to calculate costs based on the current steering angle and/or steering rate of the vehicle 102 relative to the current limits for steering angle and/or steering rate.

In some examples, the cost generator component 224 may calculate a first cost based on the current steering angle relative to a current steering angle limit, and may calculate a second cost based on the current steering rate relative to a current steering rate limit. In some cases, the cost generator component 224 may use loss functions that output non-zero cost values when the current steering angle or rate of the vehicle 102 exceeds the current steering angle or rate limit, and outputs a zero cost when the current vehicle steering angle or rate does not exceed the current steering angle or rate limit. In other cases, the loss function(s) may output increasing non-zero cost values when the current vehicle steering angle or rate approaches (but has not yet reached) the steering angle or rate limit, and further increasing cost values when the current vehicle steering angle or rate exceeds the steering angle or rate limit. By way of example and not limitation, the cost generator component 224 may use L2 hinge loss functions, such as the functions shown below in equations 1 and 2, to compute a steering angle cost (equation 1) and a steering rate cost (equation 2).

$$\text{steering angle cost} = 0.5 * w1 * \max(0, \text{angle} - \text{angle limit})^2 \quad (1)$$

$$\text{steering rate cost} = 0.5 * w2 * \max(0, \text{rate} - \text{rate limit})^2 \quad (2)$$

In these examples, w1 and w2 may represent configurable values to allow the cost generator component 224 to weight the steering angle cost and/or steering rate cost relative to other costs used to evaluate trajectories and determine optimized trajectories for the vehicle 102.

The cost function component 226 may execute one or more cost equations/functions, to determine a cost associated with a particular trajectory of the vehicle 102. As described above, cost functions may be used to evaluate and compare different possible vehicle trajectories, such as an existing trajectory and multiple potential trajectories, to determine an optimized (e.g., lowest cost) vehicle trajectory. Various examples of costs functions that may be used by the cost function component 226 are described below in more detail in reference to FIG. 6. In any number of the examples described herein, the cost function component 226 may include the steering angle costs and/or steering rate costs received from the cost generator component 224, as input to the cost functions used to determine and evaluate trajectories.

Figure 3A:
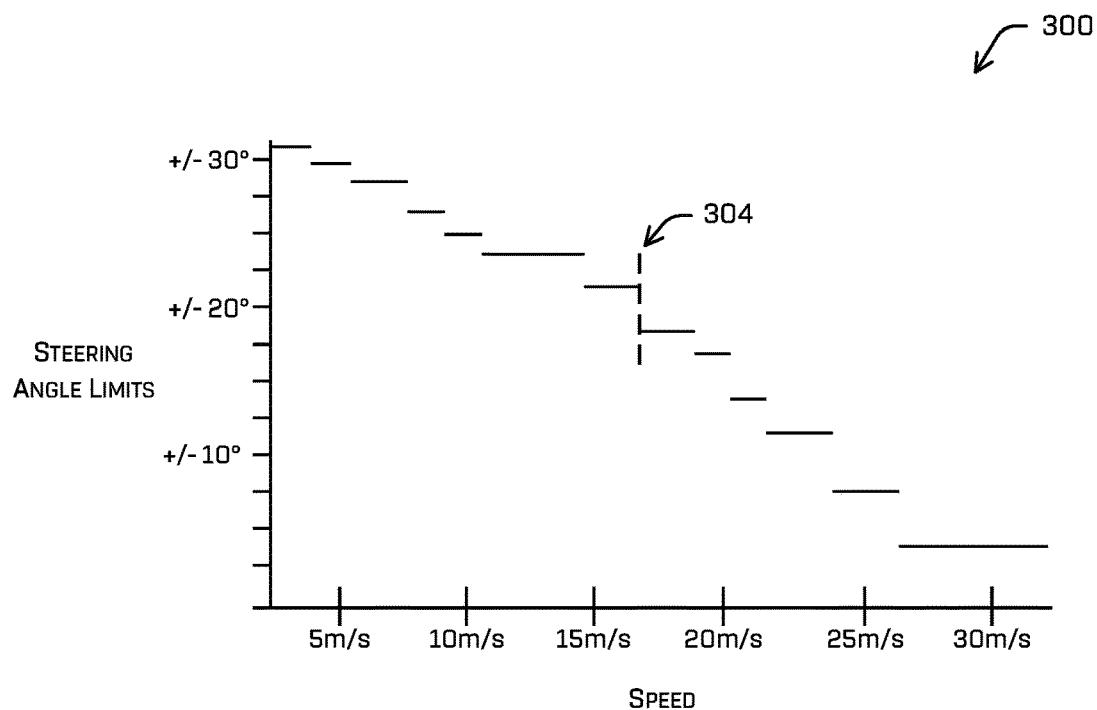
FIGS. 3A and 3B illustrate two example graphs of velocity-based steering limit data associated with a vehicle, in accordance with one or more examples of the disclosure.
Figure 3B:
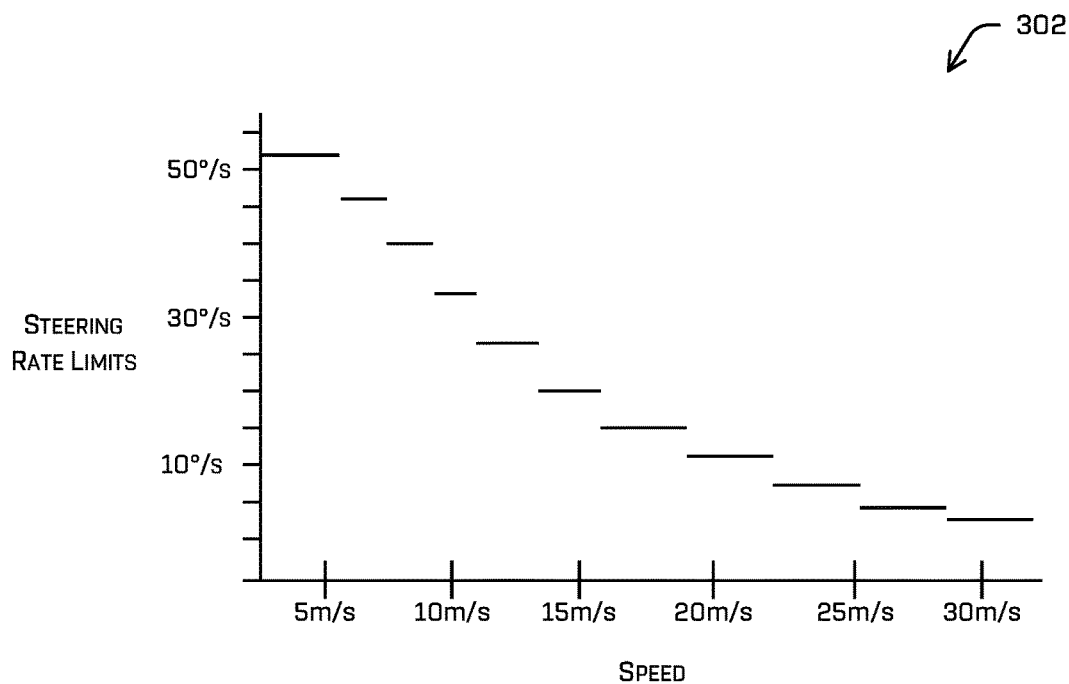

FIGS. 3A and 3B illustrate two example graphs of velocity-based steering limits associated with a vehicle. In this example, graph 300 depicts a set of steering angle limits for a vehicle (e.g., vehicle 102) based on the vehicle speed, and graph 302 depicts a set of steering rate limits for the vehicle 102 based on vehicle speed. As shown in these examples, the permissible ranges of steering angles and steering rates generally may decrease as the speed of the vehicle 102 increases. However, as shown in FIGS. 3A and 3B, the steering angle limits and the steering rate limits may decrease at different rates and/or at different speed intervals from one another. The steering angle limits and steering rate limits shown in these examples may be determined, as described above, based on kinematic or dynamic vehicle models and/or safety requirement data associated with the vehicle 102. As a result, the steering angle limits and steering rate limits shown in graphs 300 and 302 need not include fixed or uniform ranges of values with respect to either axis. Rather, the velocity-based changes in steering angle limits and/or steering rate limits may fluctuate in non-uniform ways, including increasing or decreasing steering limits at various vehicle speeds, based on the vehicle models executed by the steering limit generator 204.

As shown in this example, the steering angle limits and steering rate limits in graphs 300 and 302 may be based on discrete and discontinuous sets of steering limit values. As described above, the steering limit generator 204 may provide lookup tables of steering limit values, for example, indicating ranges of vehicle speeds associated with particular steering limits, or vice versa. However, graphs generated based on lookup tables and/or other sets of discrete steering limit values may include discontinuities, which can cause function errors or other malfunctions when attempting to determine steering costs and/or execute cost functions to determine optimized trajectories. For example, the dotted line 304 in graph 300 represents a vehicle speed of approximately 17 m/s. Graph 300 is discontinuous at the vehicle speed indicated by dotted line 304, meaning that just below this speed (e.g., 16.99 m/s) a first steering angle limit may apply (e.g., approx. +/−22 degrees), while just above this speed (e.g., 17.01 m/s) there is a distinct break in continuity and a significantly different steering angle limit may apply (e.g., approx. +/−17 degrees). These discontinuities may cause technical problems for calculating steering costs and/or executing cost-based trajectory optimization functions, or for any additional steering limit analysis that require continuous and differentiable steering limit functions.

Figure 4:
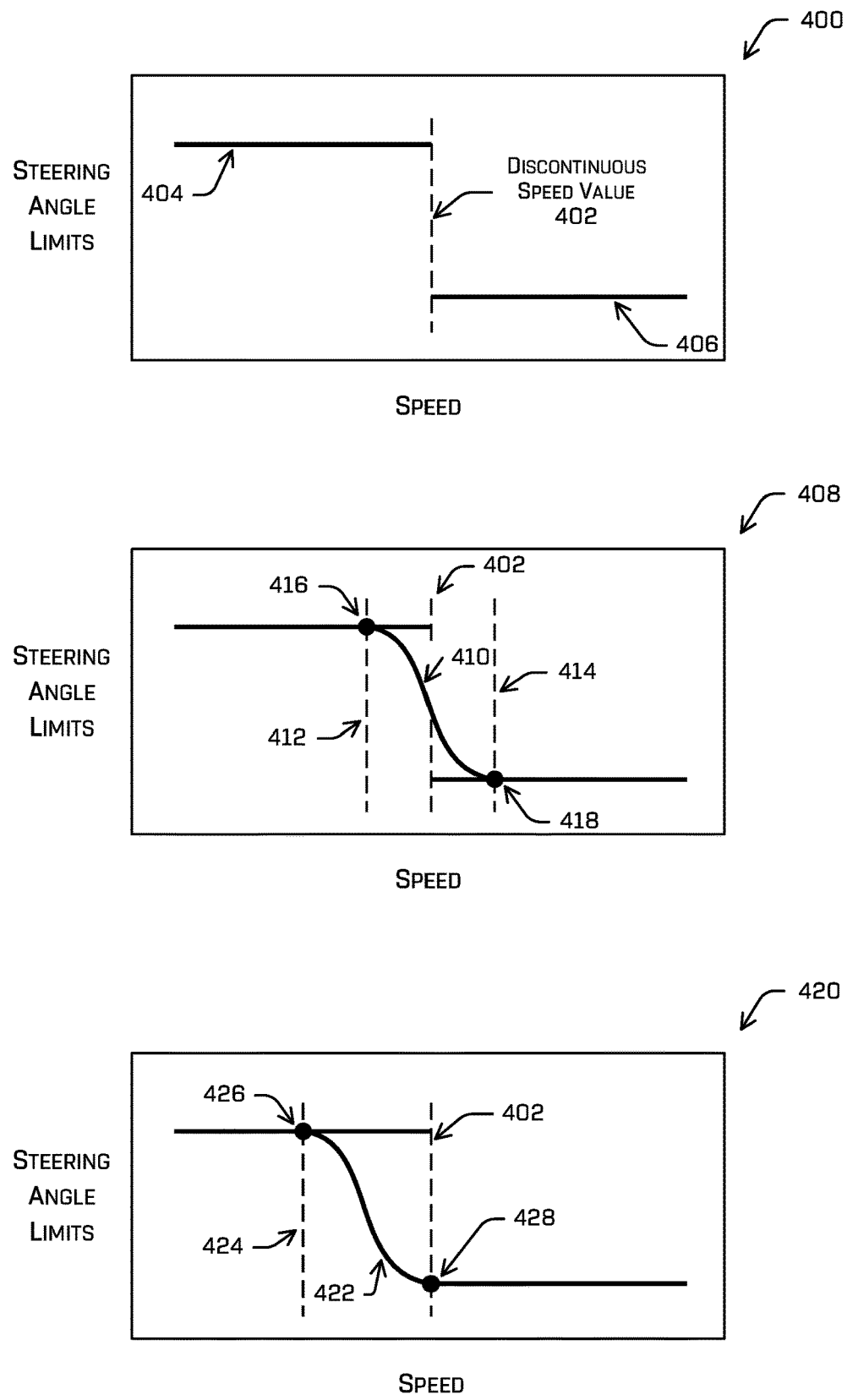
FIG. 4 illustrates example techniques of converting discontinuous steering limit data into a continuous function for use in on-vehicle trajectory generation and optimization, in accordance with one or more examples of the disclosure.

FIG. 4 depicts an example technique of converting a graph and/or a table of discrete steering limits into a continuous function. As shown in this example, the limit conversion component 222 may receive discontinuous steering limit data. The discontinuous steering limit data may correspond to a graph or a table of velocity-based steering angle limits or steering rate limits, such as graph 300 or 302 described above. As noted above, the steering limit data received by the limit conversion component 222 may include a set of discrete and discontinuous steering limit values representing maximum steering angles and/or rates associated with the vehicle 102. The limit conversion component 222 can convert the discrete and discontinuous steering limit data into a continuous and differentiable function that can be used to determine steering costs for the vehicle 102.

In this example, graph 400 may represent a portion of a speed angle limit graph or table (e.g., graph 300) including a discontinuity. Although this example is associated with converting a discontinuous speed angle limit graph or table, other examples may use similar or identical techniques for converting a discontinuous speed rate limit graph or table. In this example, dotted line 402 may represent a particular speed of the vehicle 102 that is associated with two different steering angle limits: the steering angle limit 404 and the distinct and separate steering angle limit 406. In various examples, the limit conversion component 222 may use any number of polynomial functions and/or interpolation techniques to convert a portion of the graph 400 proximate to a discontinuity (e.g., dotted line 402), into a continuous function.

Graph 408 depicts an example in which the limit conversion component 222 may use cubic spline interpolation to generate a portion of continuous function 410 to replace the discontinuity within the steering limit data at dotted line 402. In this example, the limit conversion component 222 may identify a first speed value 412 and a second speed value 414 less than and greater than the discontinuous speed value at dotted line 402. The limit conversion component 222 then may determine a first intersection point 416 between the first speed value 412 and steering angle limit 404, and a second intersection point 418 between the second speed value 414 and steering angle limit 406. Using the first intersection point 416 and the second intersection point 418, the limit conversion component 222 may perform a cubic spline interpolation to determine the continuous function 410. Similar or identical techniques may be used to determine continuous functions for any number of discontinuities within the steering limit data, thereby resulting in a single continuous and differentiable function across the entire range of speeds in the steering limit data.

Additionally or alternatively, the limit conversion component 222 may use different speed values and different intersection points to determine the continuous function. In some cases, the trajectory generation component 210 may be configured to determine more or less aggressive interpolations relative to the steering limits. For instance, a more aggressive interpolation may result in a continuous function with relatively higher speeds at or near the discontinuous points, in order to allow the vehicle 102 to utilize a larger steering range and provide additional maneuverability for the vehicle. In contrast, a less aggressive interpolation may result in a continuous function with relatively slower speeds at or near the discontinuous points, so that the vehicle 102 adheres more strictly to the steering limits and is less likely to violate a steering limit at or near a discontinuous point.

For example, graph 408 depicts another example of the limit conversion component 222 using interpolation (e.g., cubic spline interpolation) to generate a continuous function 422 to replace a discontinuity within the steering limit data. In this example, the limit conversion component 222 may identify a speed value 424 less than the discontinuous speed value at dotted line 402. The limit conversion component 222 then may determine the first intersection point 426 between the speed value 424 and steering angle limit 404, and the second intersection point 428 between the discontinuous speed value at dotted line 402 and the steering angle limit 406. Using the first intersection point 426 and the second intersection point 428, the limit conversion component 222 may perform a cubic spline interpolation to determine a less aggressive continuous function 422.

Figure 5:
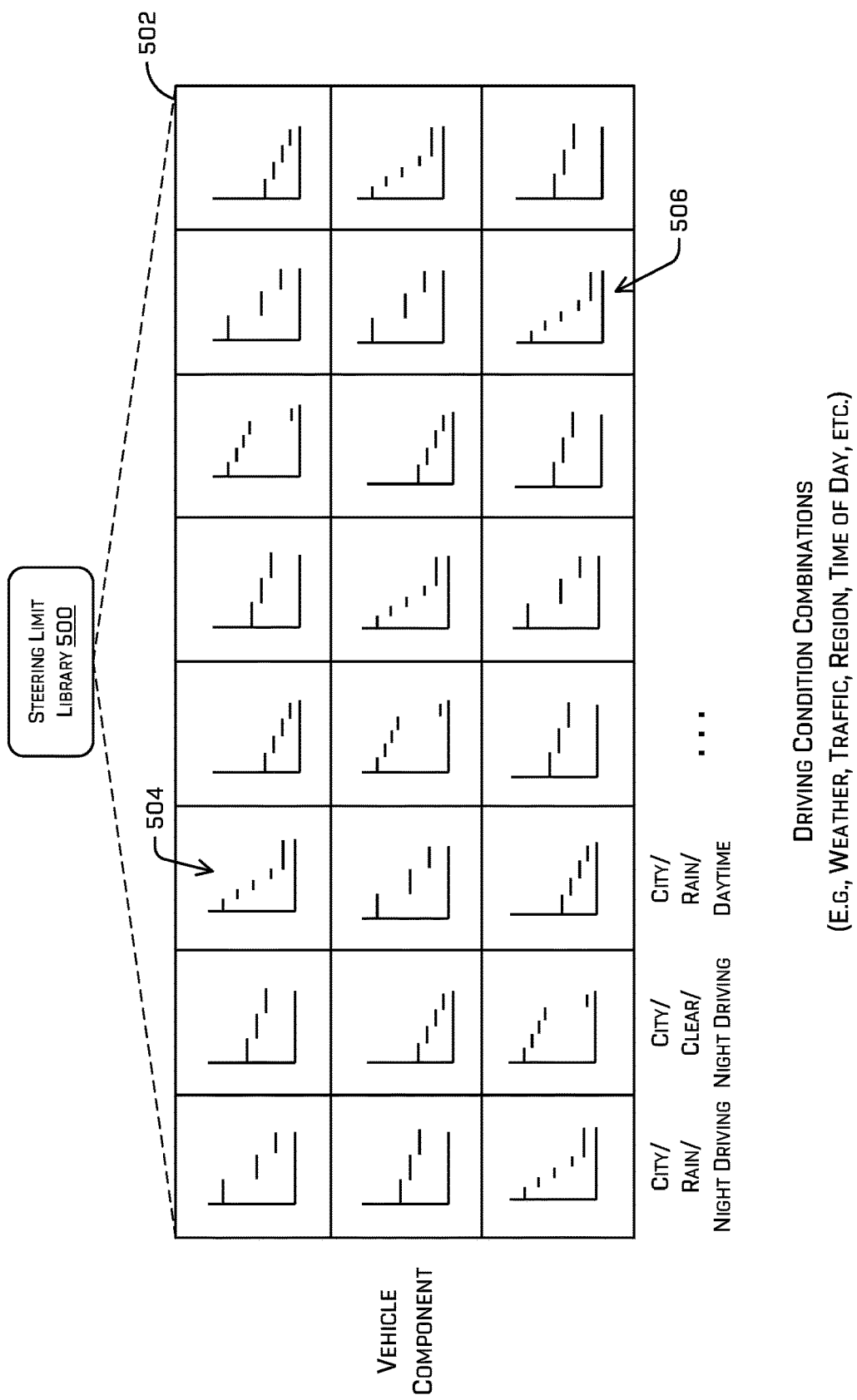
FIG. 5 illustrates an example table including different sets of steering limit data for a vehicle, associated with different vehicle components and/or driving conditions, in accordance with one or more examples of the disclosure.

FIG. 5 depicts an example of a steering limit library 500 configured to store a number of sets of steering limit data 502 associated with a vehicle 102 or multiple vehicles. In various examples, the steering limit library 500 may be stored in the on-board memory a vehicle 102, and/or may be stored on a remote computing device (e.g., server 202) associated with multiple vehicles. For instance, a steering limit library 500 stored on a server 202 may store sets of steering limit data 502 associated with different vehicle models (e.g., different combinations of vehicle make, model, year, trim, and features, etc.) and may provide particular sets of steering limits to any number of vehicles within a fleet based on the model of the requesting vehicle. For a particular vehicle model, a steering limit library 500 stored on a server 202 or within the vehicle 102 also may store different sets of steering limit data 502 associated with the particular vehicle model. For instance, for a vehicle 102, the steering limit data 502 may include different sets of steering angle and/or rate limits associated with different components of the vehicle 102 (e.g., planning component, prediction component, trajectory tracker component, trajectory optimizer component, etc.). Additionally, the steering limit data 502 associated with a vehicle 102 may include different sets of steering angle and/or rate limits associated with different combinations of driving conditions, including driving region/location, weather conditions, visibilities, number of passengers, vehicle weights, traffic conditions, etc.

The steering limit data 502 in the steering limit library 500 may include any number of graphs and/or tables (or may include functions in some cases) representing different velocity-based steering limits associated with different combinations of vehicle components and/or driving conditions. As shown in this example, the individual steering limits in the set of steering limit data 502 may include different numbers/patterns of discontinuities, based on the various vehicle speeds associated with various non-continuous steering angles (or steering rate) limits. As described above, various interpolation techniques may be used to convert the discontinuous steering limit data into a continuous and differentiable steering limit function. In some instances, the limit conversion component 222 may use different interpolation techniques for converting steering limit data, based on the different combinations of vehicle components and/or driving conditions. For instance, a first set of steering limits 504 associated with a first vehicle component and/or driving conditions, the limit conversion component 222 may use a first interpolation technique (e.g., cubic spline interpolation), and for a second set of steering limits 506 associated with a second vehicle component and/or driving conditions, the limit conversion component 222 may use a second interpolation technique (e.g., a different polynomial interpolation function).

Although this example depicts different steering limits associated with different combinations of vehicle components and/or driving conditions, in other examples, different sets of steering limits and/or different conversion functions also may be associated with different driving reference frames. For instance, for trajectories between a location and target in a route-based reference frame (e.g., on-route driving maneuvers), a first set steering limits and/or conversion function may be used, and for trajectories to or from "off-route" locations outside of a route-based reference frame (e.g., off-route driving maneuvers), a different set steering limits and/or conversion function may be used.

Figure 6:
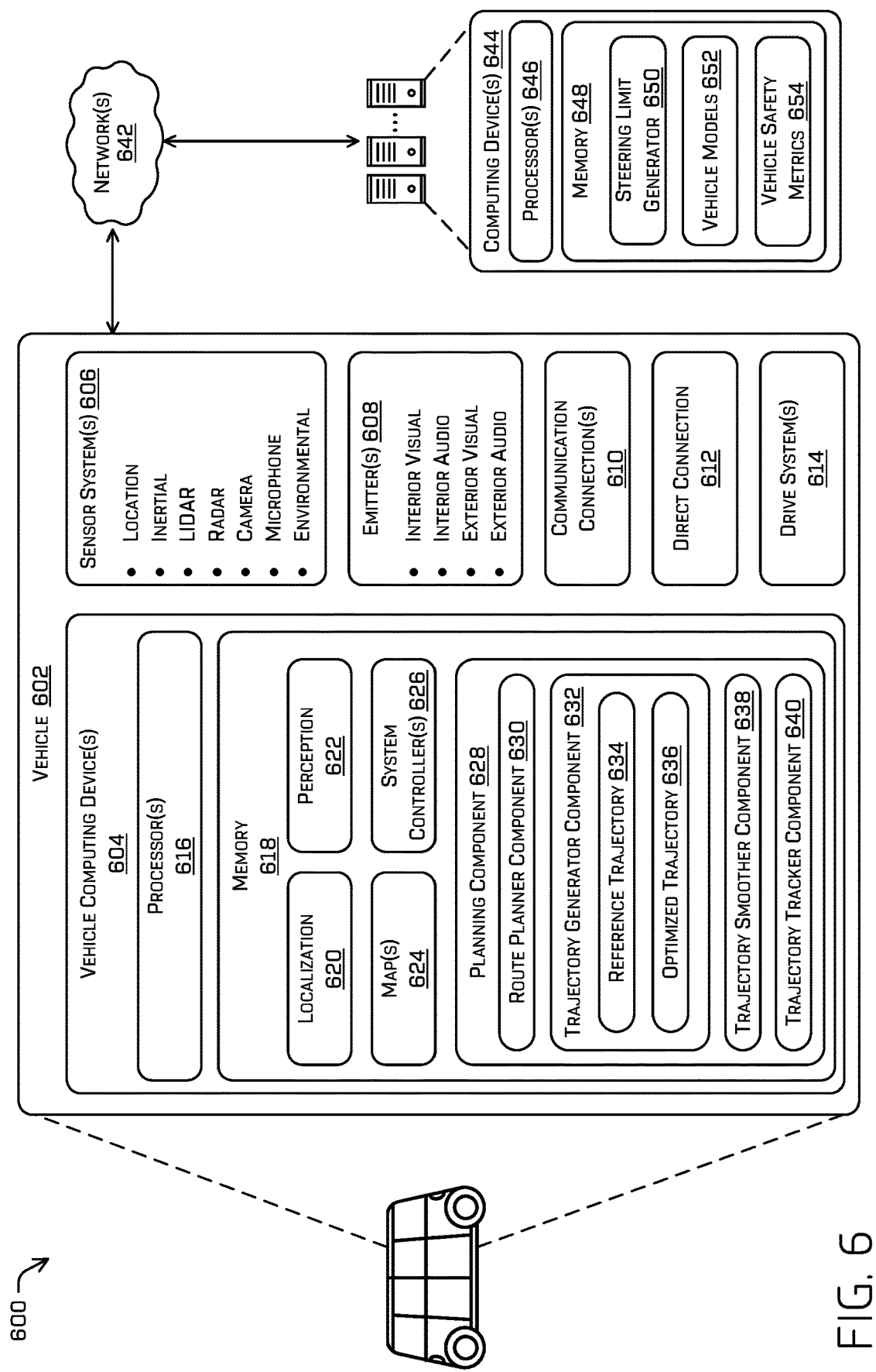
FIG. 6 depicts a block diagram of an example system for implementing various techniques described herein.

FIG. 6 depicts a block diagram of an example system 600 for implementing the techniques described herein. In at least one example, the system 600 can include a vehicle 602, which can correspond to the vehicle 102 discussed above in reference to FIGS. 1-5.

In some instances, the vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include a vehicle computing device 604, one or more sensor systems 606, one or more emitters 608, one or more communication connections 610, at least one direct connection 612, and one or more drive systems 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle (e.g., a robotic platform). In the illustrated example, the memory 618 of the vehicle computing device 604 stores a localization component 620, a perception component 622, one or more maps 624, one or more system controllers 626, and planning component 628 including a route planner component 630, a trajectory generator component 632 including a reference trajectory component 634, and an optimized trajectory component 636, a trajectory smoother component 638, and a trajectory tracker component 640. Although the trajectory generator component 632 and other components described herein are depicted in this example within the planning component 628, in other examples one or more trajectory generator component(s) 632 may be stored within any other components of the vehicle 602. Additionally although depicted in FIG. 6 as residing in the memory 618 for illustrative purposes, one or more of the localization component 620, the perception component 622, the one or more maps 624, the one or more system controllers 626, the planning component 628, the route planner component 630, the trajectory generator component 632, the reference trajectory component 634, the optimized trajectory component 636, the trajectory smoother component 638, and/or the trajectory tracker component 640 may additionally, or alternatively, be accessible to the vehicle 602 (e.g., stored on, or otherwise accessible by, memory remote from the vehicle 602, such as, for example, on memory 648 of a remote computing device 644).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for determining to load map data into memory, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 618 can further include one or more maps 624 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like); etc. In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 624 can include at least one map (e.g., images and/or a mesh). In some examples, the vehicle 602 can be controlled based at least in part on the maps 624. That is, the maps 624 can be used in connection with the localization component 620, the perception component 622, and/or the planning component 628 to determine a location of the vehicle 602, identify objects in an environment, and/or generate routes and/or trajectories to navigate within an environment.

In some examples, the one or more maps 624 can be stored on a remote computing device(s), such as within the memory 648 of the computing device(s) 644, and may be accessible to the vehicle 602 via network(s) 642. In some examples, multiple maps 624 can be retrieved from the memory 648, and stored based on, for example, a characteristic (e.g., type of entity, time of day, day of week, season of the year, etc.). Storing multiple maps 624 can have similar memory requirements, but can increase the speed at which data in a map can be accessed.

In at least one example, the vehicle computing device 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602.

In general, the planning component 628 can determine a path for the vehicle 602 to follow to traverse through an environment. As discussed above, the planning component 628 can include the route planner component 630, the trajectory generator component 632 including a reference trajectory component 634 and an optimized trajectory component 636, the trajectory smoother component 638, and the trajectory tracker component 640. Using these components, the planning component 628 may determine spatial and/or temporal trajectories for the vehicle 602 to follow, including evaluating proposed temporal trajectories and determining/selecting optimized temporal trajectories as the vehicle 602 traverses an environment.

In some instances, the route planner component 630 can be configured to determine a most efficient route to travel from a first location (e.g., a current location) to a second location (e.g., a target location). For the purpose of this discussion, a route can be a sequence of waypoints for traveling between two locations. As described above, the current location and/or the target location for the vehicle 602 can include locations within a route-based reference frame or "off-route" locations outside of a route-based reference frame (e.g., parking spots, passenger drop-off or pick-up locations, etc.). As non-limiting examples, waypoints include streets, intersections, global positioning system (GPS) coordinates, etc. In at least one example, the route planner component 630 can perform a search, such as a graph search, on top of a map to identify a route to guide the autonomous vehicle from a first location to a second location. In at least one example, the route planner component 630 can utilize a graph traversal algorithm to identify a route to guide an autonomous vehicle from a first location to a second location. Graph traversal algorithms can include algorithms for unweighted graphs (e.g., breadth-first search, depth-first search, greedy best first, A* search, etc.) and/or weighted graphs (e.g., Dijkstra's algorithm, weighted A* search, etc.).

In some examples, the route planner component 630 can identify two or more candidate routes for guiding the autonomous vehicle 602 from the first location to the second location. In such examples, the route planner component 630 can rank the two or more candidate routes based on route planning constraint(s). Route planning constraint(s) can include rules of the road, travel time, travel distance, etc. In at least one example, the route planner component 630 can determine that a top-ranking candidate route is the route for guiding the autonomous vehicle 602 from the first location to the second location. The route planner component 630 can output a sequence of waypoints corresponding to the route to the trajectory generator component 632.

In general, and in some instances, the trajectory generator component 632 can receive the route (e.g., the sequence of waypoints) and can generate instructions for guiding the autonomous vehicle 602 along at least a portion of the route from the first location to the second location. The trajectory generator component 632 may be similar or identical to the trajectory generator component 210 described above in reference to FIG. 2, and may be configured to perform any of the functionality of a trajectory generator component 210 as described herein. In at least one example, the trajectory generator component 632 can output a sequence of waypoints, which determine how to guide the autonomous vehicle 602 from a first waypoint in the sequence to a second waypoint in the sequence, and so on. In some examples, the instruction can be a trajectory or a portion of a trajectory. As discussed above, the trajectories can be spatial and/or temporal trajectories including a sequence of vehicle states, control commands, etc., associated with different locations and/or times. For example, the trajectory generator component 632 can generate a sequence of vehicle control commands (or actions) (e.g., drive down the road, accelerate, change lanes, turn left, etc.) to guide the autonomous vehicle 602 along the route. In some cases, the trajectory generator component 632 can generate various actions in the alternative. In other examples, the instruction can be a policy. A policy can be used to determine a trajectory of the autonomous vehicle 602 based on real-time processed sensor data received from sensor(s) on the autonomous vehicle 602.

As shown in this example, the trajectory generator component 632 may include a reference trajectory component 634 and an optimized trajectory component 636, described below in more detail. Additionally or alternatively, the trajectory generator component 632 can be used to define vehicle dynamics, including but not limited to lateral dynamics, longitudinal dynamics, and/or inertial dynamics.

For instance, the lateral dynamics, (e.g., a steering angle) of the vehicle 602 may be shown in the following equations. In the following equations, the i-th frame can be denoted by $g_i \in SE(2)$, while the relative transform to the subsequent reference frame can be defined as $\bar{g}_i = g_i^{-1} g_{i+1}$. Let:

$$\bar{g} = \begin{pmatrix} \bar{R} & \bar{p} \\ 0 & 1 \end{pmatrix},$$

where $\bar{R} \in SO(2)$ is the relative rotation (corresponding to angle $\bar{\theta}$) and $\bar{p} \in \mathbb{R}^2$ is the relative translation. The end-point of the arc corresponding to the system motion with curvature $\kappa_i$ resulting in heading error $e_{\theta_{i+1}}$ then takes the form:

$$p_i(e_{\theta_{i+1}}) = \frac{1}{\kappa_i} \begin{pmatrix} \sin(e_{\theta_{i+1}} + \bar{\theta}_i) - \sin e_{\theta_i} \\ \cos e_{\theta_i} - \cos(e_{\theta_{i+1}} + \bar{\theta}_i) + e_{y_i} \kappa_i \end{pmatrix} \quad (3)$$

expressed in the reference frame $g_i$.

In some instances, the integrator update step is equivalent to finding $(e_{\theta_{i+1}}, e_{y_{i+1}})$ which satisfy:

$$p_i(e_{\theta_{i+1}}) = \bar{p}_i + e_{y_{i+1}} \bar{r}_i \qquad (4)$$

where $$\bar{r}_i = \bar{R}_i \begin{pmatrix} 0 \\ 1 \end{pmatrix}$$

is the lateral unit vector of the relative reference rotation defined by $$\begin{bmatrix} \cos(\bar{\theta}) & -\sin(\bar{\theta}) \\ \sin(\bar{\theta}) & \cos(\bar{\theta}) \end{bmatrix}.$$

In some instances, the two equations with two unknowns can be solved exactly. First, the relationship in equation (4) can be expressed as:

$$\begin{pmatrix} \sin(e_{\theta_{i+1}} + \bar{\theta}_i) \\ -\cos(e_{\theta_{i+1}} + \bar{\theta}_i) \end{pmatrix} = \begin{pmatrix} \sin(e_{\theta_i}) \\ -\cos(e_{\theta_i}) \end{pmatrix} + \kappa_i \left[ -\begin{pmatrix} 0 \\ e_{y_i} \end{pmatrix} + \bar{p}_i + e_{y_{i+1}} \bar{r}_i \right], \qquad (5)$$

and after taking the squared norm of each side and dividing by the curvature $\kappa_i$, the dependence on $e_{\theta_{i+1}}$ can temporarily be removed to and solved for the unknown $e_{y_{i+1}}$, as the root of the quadratic equation:

$$2a_i^T b_i + \kappa_i \|b_i\|^2 + 2(a_i + \kappa_i b_i)^T \bar{r}_i e_{y_{i+1}} + \kappa_i e_{y_{i+1}}^2 = 0, \qquad (6)$$

where $$a_i = \begin{pmatrix} \sin(e_{\theta_i}) \\ -\cos(e_{\theta_i}) \end{pmatrix}$$

and $$b_i = -\begin{pmatrix} 0 \\ e_{y_i} \end{pmatrix} + \bar{p}_i.$$

From the two roots, in some instances, the root that is closer to the previous offset $e_{y_i}$ can be selected. However, in some instances, the root that is further from the previous offset $e_{y_i}$ can be selected as well, or any combination thereof. Afterwards, the second unknown $e_{\theta_{i+1}}$ can be found using atan2 applied to the right-hand-side of equation (5). In examples where the curvature is near zero, the solution reduces to:

$$e_{y_{i+1}} = -\frac{a_i^T b_i}{a_i^T \bar{r}_i} \qquad (7)$$

In some instances, in order to be able to project onto the reference next frame, only a subset of curvatures can be allowed. That subset of allowed curvatures can be given by $\kappa_i \in [\kappa_i^-, \kappa_i^+]$, where $K^\pm$ are the minimum and maximum roots of the quadratic equation:

$$(a^T \bar{r})^2 + (a^T \bar{r} b^T \bar{r} - a^T b)\kappa + [(b^T \bar{r})^2 - \|b\|]^2 = 0 \qquad (8)$$

Additionally or alternatively, the trajectory generator component 632 may define the longitudinal dynamics (e.g., an acceleration) of the vehicle 602. In some instances, the longitudinal dynamics corresponds to computing the travelled arc-length:

$$\Delta l_i = \begin{cases} \dfrac{e_{\theta_{i+1}} + \bar{\theta}_i - e_{\theta_i}}{\kappa_i} & \text{for } \kappa_i \neq 0 \\ \|\bar{p}_i + e_{y_{i+1}} \bar{r}_i\| & \text{otherwise} \end{cases} \qquad (9)$$

and then updating the velocity in closed form:

$$v_{i+1} = \sqrt{v_i^2 + 2a \Delta l_i} \qquad (10)$$

As described above in reference to FIGS. 1-5, the trajectory generator component 632 may be configured to determine and/or optimize trajectories based at least in part on the steering angle and/or rate limits associated with the vehicle 602. In some instances, the trajectory generator component 632 may use loss functions (or cost functions) that include steering costs, alone or in combination with other costs, to determined lowest-cost trajectories. In various examples, the trajectories determined by the trajectory generator component 632 based on the vehicle steering limits may include reference trajectories determined by a reference trajectory component 634, and/or optimized trajectories determined by an optimized trajectory component 636.

In some instances, the reference trajectory component 634 can be configured to generate an "ideal" route based at least in part on the route provided by the route planner component 630. The reference trajectory component 634, which may be a spatial and/or a temporal trajectory, can generate a plurality of reference trajectories, each reference trajectory corresponding to an individual action. In some instances, a reference trajectory can be based at least in part on a centerline of a road segment (e.g., to orient a vehicle within a center of a lane). In some instances, reference trajectories can be determined by the reference trajectory component 634 and/or can be received from an external computing device (e.g., from a teleoperations center) via the network(s) 642.

In some instances, the optimized trajectory component 636 can perform an optimization based on a reference trajectory to generate an optimized trajectory. In various examples, a reference trajectory, an optimized trajectory, or both the reference trajectory and the optimized trajectory may be temporal trajectories. In some instances, the optimized trajectory component 636 can use a projected stagewise Newton method to evaluate a plurality of loss functions to generate the optimized trajectory. For example, the following loss functions can be used:

$$L_i^{ref}(x,u) = 1/2 \|x - \bar{x}_i\|_{Q_i}^2 + 1/2 \|u - \bar{u}\|_{R_i}^2 \qquad (11)$$

$$L_N^{ref}(x) = \frac{1}{2} \|x - x_N\|_{Q_N}^2 \qquad (12)$$

$$L_i^{env}(x) = \frac{w_{e_y}}{2} \left( [e_y - e_{y_i}^+ - \epsilon_{e_y}]_{>0}^2 + [e_y - e_{y_i}^- + \epsilon_{e_y}]_{<0}^2 \right) \qquad (13)$$

$$L_i^{lat}(x,u) = \frac{w_k}{2} \left( \frac{k_d - \kappa}{\Delta t_{ref}} \right)^2 + L_i^{env}(x) \qquad (14)$$

$$L_i^{lon}(x,u) = \frac{w_a}{2} \left( \frac{a_d - a}{\Delta t_{ref}} \right)^2 + \frac{w_v}{2} \left( [v - v_i^+ - \epsilon_v]_{>0}^2 \right) \qquad (15)$$

$$L_i^{lon}(x,u) = \frac{w_a}{2} \left( \frac{a_d - a}{\Delta t_{ref}} \right)^2 + \frac{w_v}{2} \left( [v - v_i^+ - \epsilon_v]_{>0}^2 \right) \qquad (35)$$

In some examples, equation (11) corresponds to a loss function based at least in part on a distance between the autonomous vehicle and a corresponding point associated with the reference trajectory.

In some examples, equation (12) corresponds to the distance between the autonomous vehicle and the reference trajectory at the last point (or n-th point) on the reference trajectory.

In some examples, equation (13) corresponds to a loss function based at least in part on a distance between the autonomous vehicle and an object in the environment. In some examples, the variable $w_{e_y}$ corresponds to a weight associated with the lateral offset. In some examples, the variables $e_{y_i}^+$ and $e_{y_i}^-$ correspond to desired lateral offsets. In some examples, the variable $\in_{e_y}$ represents a lateral offset margin.

In some examples, equation (14) corresponds to a loss function or a fourth loss function based at least in part on the plurality of curvature values associated with the reference curvature and desired curvatures.

In some examples, equation (15) corresponds to a loss function based at least in part on the plurality of target velocities or longitudinal acceleration of the autonomous vehicle. In some examples, the variable $w_a$, corresponds to a weight associated with a lateral acceleration, and the variable $w_v$ corresponds to a weight associated with a lateral velocity. In some examples, the variable $\epsilon_v$ corresponds to a velocity margin.

Additional loss functions can be based at least in part on one or more of lateral acceleration, curvature(s), comfort, trip duration, and the like. As can be understood, one or more loss functions can be based on some or all of the loss functions discussed herein, but is not limited to the loss functions discussed herein.

In some instances, the above-listed loss functions can be evaluated together to determine the complete costs associated with an optimized trajectory as:

$$L_i(x,u)=L_i^{ref}(x,u)+L_i^{lat}(x,u)+L_i^{lon}(x,u) \quad (46)$$

$$L_N(x,u)=L_N^{ref}(x,u)+L_i^{env}(x) \quad (17)$$

In some instances, the trajectory smoother component 638 can include functionality to receive an instruction (e.g., from the trajectory generator component 632) and optimize the instruction based on objects identified in the environment. In at least one example, the trajectory smoother component 638 can access, receive, and/or determine real-time processed sensor data to determine object(s) in the environment where the autonomous vehicle 602 is traveling. In the at least one example, the trajectory smoother component 638 can process the instruction in view of the real-time processed sensor data.

In an example where the instruction is a trajectory, the trajectory smoother component 638 can leverage model(s) and/or algorithm(s), constraint(s), and/or cost(s) to optimize the trajectory. For instance, the trajectory smoother component 638 can utilize model(s) and/or algorithm(s) including, but not limited to, differential dynamic programming, interior point optimization, sequential quadratic programming, etc. to refine the trajectory. In at least one example, the constraint(s) can include, but are not limited to, geometry and/or physical properties of the vehicle and/or environment, etc. In at least one example, the cost(s) can include, but are not limited to, performance (e.g., speed), minimizing lateral acceleration, distance from other objects, positioning in a lane, etc. In at least one example, the model(s) and/or algorithm(s) can include bi-directionality. In such an example, a velocity of the autonomous vehicle can be optimized to include a positive, a negative, or a zero value. In at least one example, a rotation of the autonomous vehicle can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory smoother component 638 can generate an output trajectory.

In an example where the instruction is a policy, the trajectory smoother component 638 can leverage model(s) and/or algorithm(s), constraint(s), and/or cost(s) to generate a trajectory based on the policy and real-time processed sensor data. For instance, the trajectory smoother component 638 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

As described above, the trajectory smoother component 638 can access, receive, and/or determine real-time processed sensor data. The trajectory smoother component 638 can leverage the real-time processed sensor data to generate an output trajectory. The trajectory smoother component 638 can utilize a more detailed model of the autonomous vehicle than the trajectory generator component 632. Processing that utilizes such a detailed model can be computationally expensive. Additionally, the trajectory smoother component 638 can output an output trajectory within a predetermined amount of time after receiving the real-time processed sensor data. For instance, in at least one example, the trajectory smoother component 638 can receive an interrupt requesting an output trajectory and the trajectory smoother component 638 can provide an output trajectory responsive to receiving the interrupt.

In some instances, the trajectory tracker component 640 can include functionality to receive an output trajectory from the trajectory smoother component 638 and can compute commands for actuating steering and acceleration of the autonomous vehicle 602 to enable the autonomous vehicle 602 to follow the output trajectory. In at least one example, the trajectory tracker component 640 can receive the output trajectory and can compute a steering angle and velocity to enable the autonomous vehicle 602 to follow the output trajectory. In some examples, the trajectory tracker component 640 can include a separate vehicle controller configured to control steering, propulsion, braking, safety, emitters, communication, and other systems of the vehicle.

In some instances, the planning component 628 can include a prediction component to generate predicted trajectories of objects in an environment. For example, a prediction component can generate one or more predicted trajectories for vehicles, pedestrians, animals, and the like within a threshold distance from the vehicle 602. In some instances, a prediction component can measure a trace of an object and generate a trajectory for the object based on observed and predicted behavior.

As can be understood, the components discussed herein (e.g., the localization component 620, the perception component 622, the one or more maps 624, the one or more system controllers 626, the planning component 628, the route planner component 630, the trajectory generator component 632, the reference trajectory component 634, the optimized trajectory component 636, the trajectory smoother component 638, and the trajectory tracker component 640)

are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 618 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 606 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the LIDAR sensors can include individual LIDAR sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally or alternatively, the sensor system(s) 606 can send sensor data, via the one or more networks 642, to the one or more computing device(s) at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 642. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more systems to perform various functionalities of the drive system(s) 614. Furthermore, the drive system(s) 614 also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In at least one example, the localization component 620, the perception component 622, the one or more maps 624, the one or more system controllers 626, the planning component 628, the route planner component 630, the trajectory generator component 632, the reference trajectory component 634, the optimized trajectory component 636, the trajectory smoother component 638, and the trajectory tracker component 640 can process sensor data, as described above, and can send their respective outputs, over the one or more network(s) 642, to one or more computing device(s). In at least one example, the aforementioned components can send their respective outputs to the one or more computing device(s) at a particular frequency, after a lapse of a predetermined period of time, in near real-time, etc.

In at least one example the localization component 620, the perception component 622, the one or more maps 624, the one or more system controllers 626, the planning component 628, the route planner component 630, the trajectory generator component 632, the reference trajectory component 634, the optimized trajectory component 636, the trajectory smoother component 638, and the trajectory tracker component 640, as described above, can receive data inputs and can send their respective outputs, over the one or more network(s) 642, to one or more computing device(s) 644. In at least one example, inputs from the computing device(s) 644 (e.g., steering limit data), and outputs from the respective components of the vehicle 602 can be transmitted/received at a particular frequency, after a lapse of a predetermined period of time, in near real-time, etc. Additionally or alternatively, the vehicle 602 can send driving log data to one or more computing device(s) 644 via the network(s) 642, including raw sensor data, processed sensor data and/or representations of sensor data. Such driving log data (or sensor data) can be sent as one or more log files to the computing device(s) 644 at a particular frequency, after a lapse of a predetermined period of time, in near real-time, etc.

The computing device(s) 644 can include processor(s) 646 and a memory 648. As described above, the memory 648 of the computing device(s) 644 may store and execute a steering limit generator 650, vehicle models 652, and/or vehicle safety metrics 654. The steering limit generator 650, vehicle models 652, and/or vehicle safety metrics 654 may be similar or identical to correspond steering limit generator 204, kinematic vehicle models 206, and/or vehicle safety requirements 208 described above in reference to FIG. 2, and may be configured to perform any of the functionality of the server 202 as described herein. As described above, a steering limit generator 650 may generate and store any number of steering limit data for vehicles within a fleet, including different combinations of velocity-based steering angle limits and steering rate limits for different vehicle models, different driving regions, different types of driving locations, different types of driving conditions and/or associated different vehicle components that may request a trajectory.

The processor(s) 616 of the vehicle 602 and the processor(s) 646 of the computing device(s) 644 can be any suitable processor capable of executing instructions to process data and perform operations as described herein. By way of example and not limitation, the processor(s) 616 and 646 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 648 are examples of non-transitory computer-readable media. The memory 618 and 648 can store an operating system and one or more software applications, instructions, programs, and/or data to implement the methods described herein and the functions attributed to the various systems. In various examples, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be included in the computing device(s) 644 and/or components of the computing device(s) 644 can be included in the vehicle 602. That is, the vehicle 602 can perform one or more of the functions associated with the computing device(s) 644, and vice versa.

Figure 7:
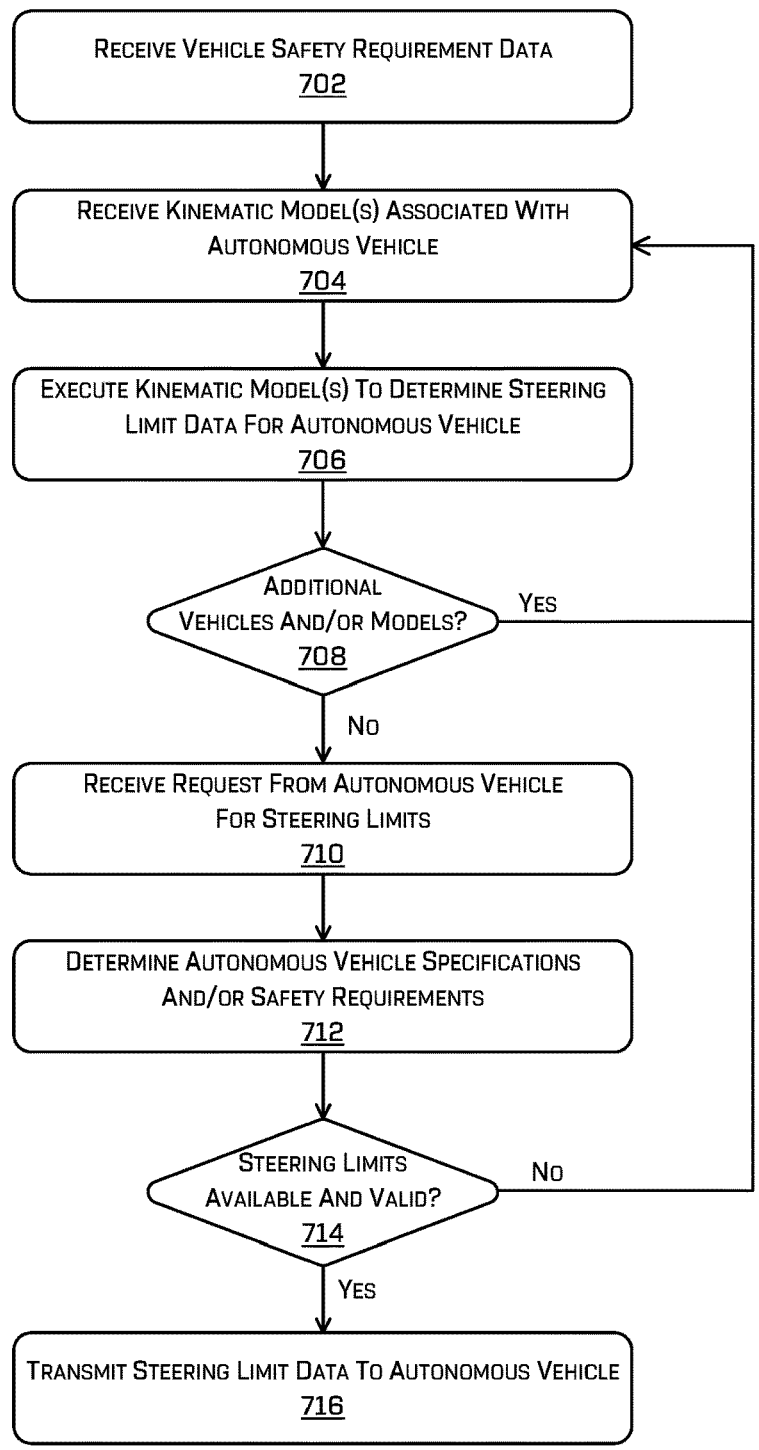
FIG. 7 is a flow diagram illustrating an example process of generating steering limit data based on a kinematic vehicle model and vehicle safety requirements, in accordance with one or more examples of the disclosure.

FIG. 7 is a flow diagram illustrating an example process 700 of generating steering limit data based on a vehicle model and vehicle safety requirements, in accordance with one or more examples of the disclosure. As described below, the operations in process 700 may be performed by a remote computing device, such as server 202 and/or computing device(s) 644. For instance, process 700 may be performed by a steering limit generator 204 (and/or a steering limit generator 650) configured to generate steering limit data associated with a vehicle or fleet of vehicles operating in a driving environment.

At operation 702, the steering limit generator 204 may receive vehicle safety requirements associated with one or more vehicles (e.g., vehicle 102) in a driving environment. The maximum curvature and/or maximum curvature rate requirements may be based on a maximum acceptable lateral deviation for the vehicle 102 from its intended path. In some examples, the steering limit generator 204 may determine maximum curvature and/or maximum curvature rates requirements for particular vehicle 102, as a function of speed. As noted above, different vehicle safety requirements may be associated with different types of vehicles in a fleet.

At operation 704, the steering limit generator 204 may receive one or more kinematic (or dynamic) models associated the vehicle 102. As discussed above, kinematic and/or dynamic vehicle computing models may be associated with different vehicle makes, models, trims, years, etc. In some cases, kinematic model(s) 206 may include a dynamic bicycle model of the vehicle 102 which takes into account lateral motion and/or wheel slip, or a kinematic bicycle model of the vehicle 102 which does not. Different kinematic and/or dynamic models for a vehicle 102 may generate different steering commands based on the same curvature, resulting in different steering limits and/or steering limit functions for the different components of the autonomous vehicle.

At operation 706, the steering limit generator 204 may execute the kinematic (or dynamic) models associated the vehicle 102 to determine steering limit data associated with the vehicle 102. In some examples, the steering limit generator 204 may generate steering limit data associated with a vehicle 102, as table, graph, or other data structure including discrete and/or discontinuous steering limit values. As described above, a set of steering limit data for the vehicle 102 may be associated with a particular combination of vehicle and/or driving attributes, such as a particular vehicle component, driving location/region, driving conditions, reference system, etc. Accordingly, the steering limit generator 204 in operation 706 may generate vehicle-specific steering limit data applicable to an individual vehicle and/or a subset of vehicles within a fleet of different vehicle types/models. For a particular vehicle 102, or for a particular vehicle type/model, the steering limit generator 204 also may determine multiple sets of velocity-based steering angle and rate limits, associated with the various combinations of the vehicle attributes and/or driving conditions described herein.

As shown in these examples, the server 202 including the steering limit generator 204 may be configured to determine and provide different sets of applicable steering limits to different vehicles in a fleet. The applicable steering limits may be provided to each vehicle based on the specifications of the particular vehicle, as well as the driving environment and conditions in which the particular vehicle is operating. In such examples, the steering limit generator 204 may be configured to receive and respond to requests from vehicles for updated steering limits, for instance, based on changes in the driving conditions, operating conditions, or the driving region of the vehicle. Additionally or alternatively, the steering limit generator 204 may initiate determining and transmitting updated steering limits to vehicles, based on updated vehicle computing models, updated safety requirements, changes in geographic regions/locations, etc.

At operation 708, the steering limit generator 204 may determine whether additional steering limits are needed for additional vehicles, models, components, and/or conditions. As noted above, the steering limit generator 204 may determine and store a steering limit library 500 including different sets of steering limits for a particular vehicle 102 and/or different sets of steering limits for different vehicles based on vehicle component, driving conditions, etc. When the steering limit generator 204 determines additional steering limit data is needed for additional vehicles and/or vehicle models 206, and/or for different vehicle components, driving conditions, etc. (708:Yes), then in this example process 700 may return to operation 704 to determine additional steering limit data associated with the additional vehicles, models, driving conditions, etc. In contrast, when the steering limit generator 204 determines no additional steering limit data is needed at a current time, (708:No), then at operation 710 the steering limit generator 204 may proceed to operation 710.

At operation 710, the steering limit generator 204 may receive a request from a particular vehicle (e.g., vehicle 102) for steering limit data. In some cases, the vehicle 102 may request confirmation of steering limit data and/or updated steering limit data in response to changing a driving location or region, updated driving conditions, etc. In other cases, the steering limit generator 204 may initiate providing updated steering limit data to the vehicle 102, based on any or all of the same conditions.

At operation 712, the steering limit generator 204 may determine vehicle specifications and/or safety requirements associated with the vehicle 102 from which the request was received in operation 710. For instance, the steering limit generator 204 may determine a make, model, year, trim, and/or other attributes of the vehicle 102 (e.g., tires, software component versions, etc.). The steering limit generator 204 also may determine additional data, such as the current location of the vehicle 102, the current driving conditions (e.g., traffic, weather, etc.) in which the vehicle is operating, etc.

At operation 714, the steering limit generator 204 may determine, based at least in part on the vehicle specifications and/or safety requirements determined in operation 712, whether the steering limit generator 204 stores the applicable set of steering limits for the vehicle 102. As shown in this example, the steering limit generator 204 also may determine whether the applicable steering limits (e.g., corresponding to the vehicle 102, component, region, and/or current driving conditions) stored on the server 202 are valid. For instance, any set of steering limits within a steering limit library 500 may include an expiration time. Additionally, any set of steering limits may be associated with a particular set of vehicle safety requirements 208 and/or a particular vehicle model 206, which may be determined by the steering limit generator 204 to be current or outdated versions. When the steering limit generator 204 does not include an applicable (and current/valid) set of steering limits for the vehicle 102 (714:No), then in this example process 700 may return to operation 704 to determine additional steering limit data applicable with the vehicle 102 from which the request was received. In contrast, when the steering limit generator 204 does include an applicable (and current/valid) set of steering limits for the vehicle 102 (714:Yes), then at operation 716 the steering limit generator 204 may retrieve and transmit the corresponding steering limit data to the vehicle 102. In various examples, the steering limit generator 204 may transmit individual sets of velocity-based steering limit data (e.g., steering limit data 216), and/or may a steering limit library of various sets of steering limit data associated with the vehicle 102.

Figure 8:
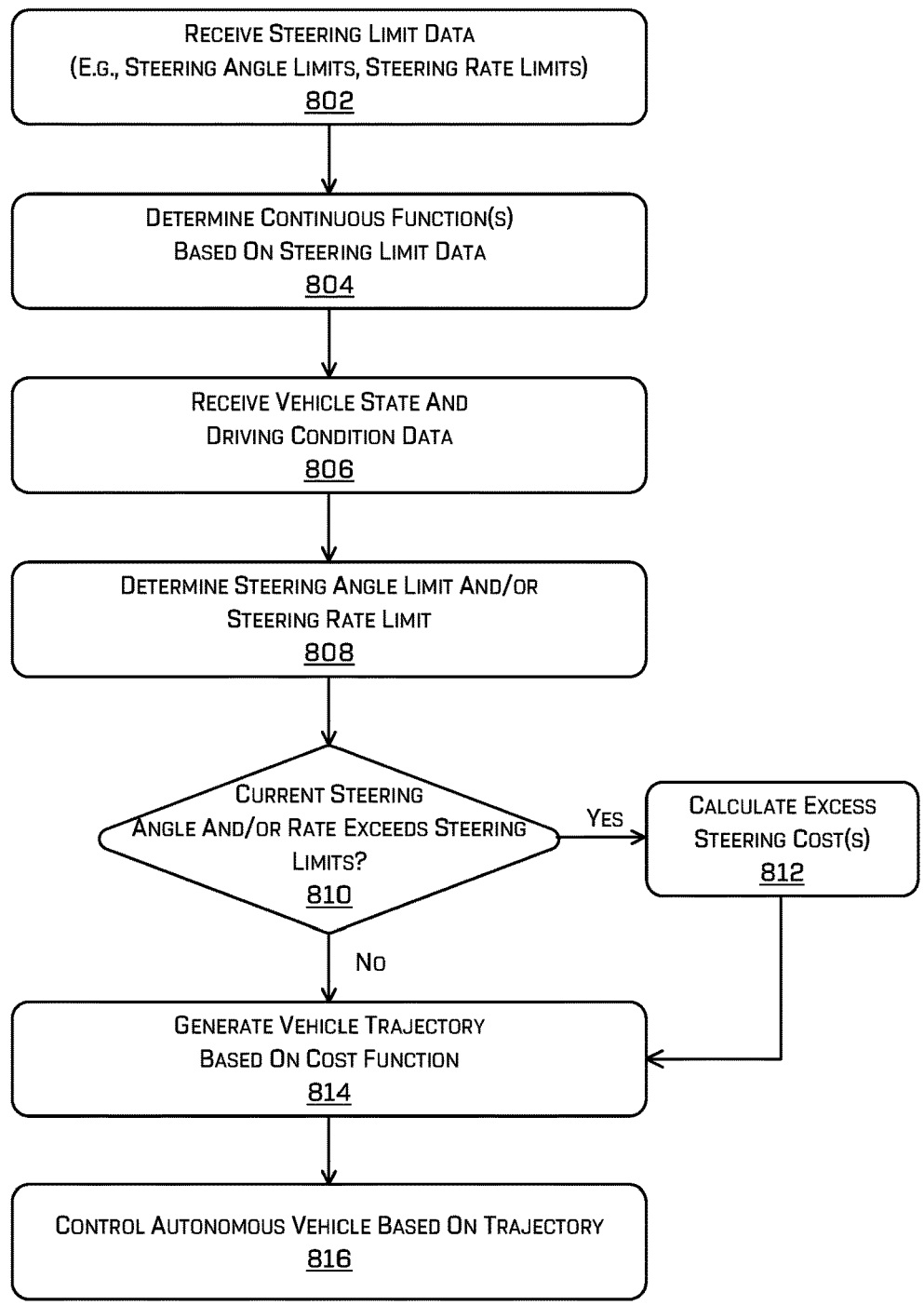
FIG. 8 is a flow diagram illustrating an example process of generating trajectories for controlling an autonomous vehicle using vehicle-based steering limits, in accordance with one or more examples of the disclosure.

FIG. 8 is a flow diagram illustrating another example process 800 of generating a trajectory for controlling a vehicle using vehicle-based steering limits, in accordance with one or more examples of the disclosure. As described below, process 800 may be performed by an autonomous vehicle (e.g., vehicle 102) including a planning component including trajectory generation component 210. In various examples, a trajectory generation component 210 may receive steering limit data 216 from a steering limit generator 204 (and/or steering limit library 500), which may be on the vehicle 102 or in a remote computing system (e.g., server 202). Based on the steering limit data 216 and/or additional data relating to the vehicle components, vehicle state data, and/or driving condition data, the trajectory generation component 210 may determine a trajectory for the vehicle 102 to follow to traverse the driving environment.

Process 700 and process 800 are illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the trajectory generation component 210 may receive steering limit data 216, for example, from a steering limit library 500 and/or a steering limit generator 204. As described above, the steering limit data may include one or more velocity-based steering angle limits and/or steering rate limits. In some examples, the steering limit data 216 may include a lookup table and/or other set of discrete and discontinuous steering limits associated with vehicle speeds.

At operation 804, the trajectory generation component 210 may determine one or more continuous functions based on the steering limit data. Operation 804 may be optional in some cases, for instance, when the steering limit data 216 is provided to the trajectory generation component 210 as a continuous and differentiable function. However, when the steering limit data 216 is provided as discrete and/or discontinuous values (e.g., vehicle speeds and associated steering limits), then in operation 804 the limit conversion component 222 may be used to convert the steering limit data into a continuous function. For instance, the steering limit conversion component 222 may use cubic spline interpolation (and/or any other applicable polynomial function) to generate a continuous and differentiable function based on the set of discrete steering limit values received in operation 802.

At operation 806, the trajectory generation component 210 may receive various vehicle state data and/or driving condition data associated with the vehicle 102. For instance, the trajectory generation component 210 may receive vehicle state data 218 from the vehicle sensors and/or internal navigation systems (e.g., perception component, planning component, etc.), including but not limited to a current vehicle velocity, orientation, pose, steering data (e.g., steering angle and/or steering rate), number of passengers, vehicle curb weight, etc. Additionally, the trajectory generation component 210 may receive driving conditions data 220, include any attributes of the vehicle driving environment and/or driving conditions described herein, including but not limited to the current driving region or location of the vehicle 102, the current vehicle driving location type, the current weather conditions, current road conditions, or any other attribute of the current driving conditions or environment.

At operation 808, the trajectory generation component 210 may determine a steering angle limit and/or a steering rate limit associated with the operation of the vehicle 102 in a current driving environment. In some examples, the trajectory generation component 210 may provide the current speed of the vehicle 102 as input the function(s) determined by the steering limit conversion component 222. For instance, at a particular current vehicle speed (e.g., X m/s), the steering limit data and/or function(s) may output an associated steering angle limit (e.g., +/−Y degrees), and/or an associated steering rate limit (e.g., e.g., +/−Z degrees/sec).

At operation 810, the trajectory generation component 210 may determine whether the current steering angle and/or steering rate of the vehicle 102 (or a proposed steering angle/rate associated with a possible future trajectory) exceeds the vehicle steering limits determined in operation 808. In some examples, when the current steering angle and/or rate of the vehicle 102 exceeds the steering limits (810:Yes), then in operation 812 trajectory generation component 210 may determine associated steering cost(s) for the vehicle 102. For example, in operation 812, the cost generator component 224 may execute one or more loss functions (or cost functions) configured to calculate costs based on the current steering angle and/or current steering rate of the vehicle 102, relative to the current limits for steering angle and/or steering rate. By way of example and not limitation, the cost generator component 224 may use L2 hinge loss functions, such as the functions shown above in equations 1 and 2, to compute steering angle costs and/or steering rate costs.

At operation 814, the trajectory generation component 210 may determine a trajectory for the vehicle 102 based on a cost function. As described above, the cost function component 226 may execute one or more cost functions, to determine costs associated with current and/or possible vehicle trajectories. In some cases, cost functions may be used to determine an optimized (e.g., lowest cost) vehicle trajectory, based on a combination of steering angle costs and/or steering rate costs, as well as various other types of trajectory-related costs (e.g., optimal vehicle speed/velocity costs, optimal lateral acceleration costs, optimal lane positioning costs, optimal object safe distance costs, etc.). The cost function component 226 make invoke loss functions to calculate an overall cost associated with a trajectory, based on multiple different cost factors, and may determine an optimized (e.g., lowest cost) vehicle trajectory using the loss functions. Then, after determining a trajectory using the velocity-based steering limits, at operation 816, the planning component 104 of the vehicle 102 may use the determined trajectory to control the vehicle as it traverses through the environment 100.

EXAMPLE CLAUSES

A. A system comprising: one or more processors; and one or more non-transitory computer-readable media storing computer-executable instructions that, when executed, cause the system to perform operations comprising: determining a vehicle state associated with a vehicle in a driving environment, the vehicle state comprising a speed associated with the vehicle; determining a driving condition associated with the driving environment; receiving, based at least in part on the vehicle state and the driving condition, a steering limit table; determining a steering limit function based on the steering limit table; determining steering data associated with the vehicle; determining, based at least in part on the steering data and the steering limit function, a cost value; determining, based at least in part on the cost value, a trajectory; and controlling the vehicle in the driving environment based at least in part on the trajectory.

B. The system as recited in paragraph A, wherein: the steering data includes a steering angle and a steering rate; and determining the cost value includes: determining a first cost value based at least in part on the steering angle and a steering angle limit associated with the steering limit function; and determining a second cost value based at least in part on the steering rate and a steering rate limit associated with a second steering limit function.

C. The system as recited in paragraph A, wherein: the steering limit table includes a discontinuous point between two steering limits; and the steering limit function includes a continuous and differentiable function between the two steering limits.

D. The system as recited in paragraph C, wherein determining the steering limit function comprises: determining a cubic spline interpolation between the two steering limits.

E. The system as recited in paragraph A, the operations further comprising: determining a reference frame associated with the trajectory, wherein determining the steering limit table is based at least in part on the reference frame.

F. A method comprising: determining a vehicle state associated with a vehicle in a driving environment, the vehicle state comprising one or more of a position, speed, or heading; determining, based at least in part on the vehicle state, a steering limit associated with the vehicle; determining steering data associated with the vehicle; determining, based at least in part on the steering limit and the steering data, a cost value; determining, based at least in part on the cost value, a trajectory; and controlling the vehicle in the driving environment based at least in part on the trajectory.

G. The method of paragraph F, further comprising: determining a driving condition associated with the driving environment, wherein determining the steering limit is based at least in part on the driving condition.

H. The method of paragraph F, wherein: the steering limit includes a steering angle limit and a steering rate limit; the steering data includes a steering angle and a steering rate; and determining the cost value includes: determining a first cost value based at least in part on the steering angle and the steering angle limit; and determining a second cost value based at least in part on the steering rate and the steering rate limit.

I. The method of paragraph F, further comprising: receiving a steering limit table including at least one discontinuous point; and determining a continuous steering limit function based on the steering limit table, wherein determining the steering limit is based at least in part on the continuous steering limit function.

J. The method of paragraph I, wherein determining the continuous steering limit function comprises: determining, on the steering limit table, a first value greater than a value of the discontinuous point, relative to an axis of the steering limit table; determining, on the steering limit table, a second value less than the value of the discontinuous point, relative to the axis of the steering limit table; and determining, using cubic spline interpolation, a continuous function between the first value on the steering limit table and the second value on the steering limit table.

K. The method of paragraph F, further comprising: determining a reference frame associated with the trajectory, wherein determining the steering limit is based at least in part on the reference frame.

L. The method of paragraph F, further comprising: determining a component of the vehicle associated with executing the cost value, wherein determining the trajectory is based at least in part on the component.

M. The method of paragraph F, wherein: the cost value comprises a steering limit cost defined based at least in part on an amount a proposed steering limit meets or exceeds the steering limit.

N. One or more non-transitory computer-readable media storing processor-executable instructions that, when executed by one or more processors, cause the one or more processors to perform operations comprising: determining a vehicle state associated with a vehicle in a driving environment, the vehicle state comprising one or more of a position, speed, or heading; determining, based at least in part on the vehicle state, a steering limit associated with the vehicle; determining steering data associated with the vehicle; determining, based at least in part on the steering limit and the steering data, a cost value; determining, based at least in part on the cost value, a trajectory; and controlling the vehicle in the driving environment based at least in part on the trajectory.

O. The one or more non-transitory computer-readable media of paragraph N, the operations further comprising: determining a driving condition associated with the driving environment, wherein determining the steering limit is based at least in part on the driving condition.

P. The one or more non-transitory computer-readable media of paragraph N, wherein: the steering limit includes a steering angle limit and a steering rate limit; the steering data includes a steering angle and a steering rate; and determining the cost value includes: determining a first cost value based at least in part on the steering angle and the steering angle limit; and determining a second cost value based at least in part on the steering rate and the steering rate limit.

Q. The one or more non-transitory computer-readable media of paragraph N, the operations further comprising: receiving a steering limit table including at least one discontinuous point; and determining a continuous steering limit function based on the steering limit table, wherein determining the steering limit is based at least in part on the continuous steering limit function.

R. The one or more non-transitory computer-readable media of paragraph Q, determining the continuous steering limit function comprises: determining, on the steering limit table, a first value greater than a value of the discontinuous point, relative to an axis of the steering limit table; determining, on the steering limit table, a second value less than the value of the discontinuous point, relative to the axis of the steering limit table; and determining, using cubic spline interpolation, a continuous function between the first value on the steering limit table and the second value on the steering limit table.

S. The one or more non-transitory computer-readable media of paragraph N, the operations further comprising: determining a reference frame associated with the trajectory, wherein determining the steering limit is based at least in part on the reference frame.

T. The one or more non-transitory computer-readable media of paragraph N, the operations further comprising: determining a component of the vehicle associated with executing the cost value, wherein determining the trajectory is based at least in part on the component.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
determining a vehicle state associated with a vehicle in a driving environment, the vehicle state comprising a speed associated with the vehicle;
determining a driving condition associated with the driving environment;
receiving, based at least in part on the vehicle state and the driving condition, a steering limit table;
determining a steering limit function based on the steering limit table;
determining steering data associated with the vehicle;
determining, based at least in part on the steering data and the steering limit function, a cost value;
determining, based at least in part on the cost value, a trajectory; and
controlling the vehicle in the driving environment based at least in part on the trajectory.

2. The system as recited in claim 1, wherein:
the steering data includes a steering angle and a steering rate; and
determining the cost value includes:
determining a first cost value based at least in part on the steering angle and a steering angle limit associated with the steering limit function; and
determining a second cost value based at least in part on the steering rate and a steering rate limit associated with a second steering limit function.

3. The system as recited in claim 1, wherein:
the steering limit table includes a discontinuous point between two steering limits; and
the steering limit function includes a continuous and differentiable function between the two steering limits.

4. The system as recited in claim 3, wherein determining the steering limit function comprises:
determining a cubic spline interpolation between the two steering limits.

5. The system as recited in claim 1, the operations further comprising:
determining a reference frame associated with the trajectory, wherein determining the steering limit table is based at least in part on the reference frame.

6. A method comprising:
determining a vehicle state associated with a vehicle in a driving environment, the vehicle state comprising one or more of a position, speed, or heading;
determining, based at least in part on the vehicle state, a steering limit associated with the vehicle;
determining steering data associated with the vehicle;
determining, based at least in part on the steering limit and the steering data, a cost value;
determining, based at least in part on the cost value, a trajectory; and
controlling the vehicle in the driving environment based at least in part on the trajectory.

7. The method of claim 6, further comprising:
determining a driving condition associated with the driving environment, wherein determining the steering limit is based at least in part on the driving condition.

8. The method of claim 6, wherein:
the steering limit includes a steering angle limit and a steering rate limit;
the steering data includes a steering angle and a steering rate; and
determining the cost value includes:
determining a first cost value based at least in part on the steering angle and the steering angle limit; and
determining a second cost value based at least in part on the steering rate and the steering rate limit.

9. The method of claim 6, further comprising:
receiving a steering limit table including at least one discontinuous point; and
determining a continuous steering limit function based on the steering limit table,
wherein determining the steering limit is based at least in part on the continuous steering limit function.

10. The method of claim 9, wherein determining the continuous steering limit function comprises:
determining, on the steering limit table, a first value greater than a value of the discontinuous point, relative to an axis of the steering limit table;
determining, on the steering limit table, a second value less than the value of the discontinuous point, relative to the axis of the steering limit table; and
determining, using cubic spline interpolation, a continuous function between the first value on the steering limit table and the second value on the steering limit table.

11. The method of claim 6, further comprising:
determining a reference frame associated with the trajectory, wherein determining the steering limit is based at least in part on the reference frame.

12. The method of claim 6, further comprising:
determining a component of the vehicle associated with executing the cost value, wherein determining the trajectory is based at least in part on the component.

13. The method of claim 6, wherein:
the cost value comprises a steering limit cost defined based at least in part on an amount a proposed steering limit meets or exceeds the steering limit.

14. One or more non-transitory computer-readable media storing processor-executable instructions that, when executed by one or more processors, cause the one or more processors to perform operations comprising:
determining a vehicle state associated with a vehicle in a driving environment, the vehicle state comprising one or more of a position, speed, or heading;
determining, based at least in part on the vehicle state, a steering limit associated with the vehicle;
determining steering data associated with the vehicle;
determining, based at least in part on the steering limit and the steering data, a cost value;
determining, based at least in part on the cost value, a trajectory; and
controlling the vehicle in the driving environment based at least in part on the trajectory.

15. The one or more non-transitory computer-readable media of claim 14, the operations further comprising:

determining a driving condition associated with the driving environment, wherein determining the steering limit is based at least in part on the driving condition.

16. The one or more non-transitory computer-readable media of claim 14, wherein:
- the steering limit includes a steering angle limit and a steering rate limit;
- the steering data includes a steering angle and a steering rate; and
- determining the cost value includes:
  - determining a first cost value based at least in part on the steering angle and the steering angle limit; and
  - determining a second cost value based at least in part on the steering rate and the steering rate limit.

17. The one or more non-transitory computer-readable media of claim 14, the operations further comprising:
- receiving a steering limit table including at least one discontinuous point; and
- determining a continuous steering limit function based on the steering limit table,
- wherein determining the steering limit is based at least in part on the continuous steering limit function.

18. The one or more non-transitory computer-readable media of claim 17, determining the continuous steering limit function comprises:
- determining, on the steering limit table, a first value greater than a value of the discontinuous point, relative to an axis of the steering limit table;
- determining, on the steering limit table, a second value less than the value of the discontinuous point, relative to the axis of the steering limit table; and
- determining, using cubic spline interpolation, a continuous function between the first value on the steering limit table and the second value on the steering limit table.

19. The one or more non-transitory computer-readable media of claim 14, the operations further comprising:
- determining a reference frame associated with the trajectory, wherein determining the steering limit is based at least in part on the reference frame.

20. The one or more non-transitory computer-readable media of claim 14, the operations further comprising:
- determining a component of the vehicle associated with executing the cost value, wherein determining the trajectory is based at least in part on the component.

* * * * *